US008493405B2

(12) United States Patent  
Kimura et al.

(10) Patent No.: US 8,493,405 B2  
(45) Date of Patent: Jul. 23, 2013

(54) IMAGE CONTROL DEVICE AND IMAGE DISPLAY SYSTEM FOR GENERATING AN IMAGE TO BE DISPLAYED FROM RECEIVED IMAGED DATA, GENERATING DISPLAY INFORMATION BASED ON THE RECEIVED IMAGE DATA AND OUTPUTTING THE IMAGE AND THE DISPLAY INFORMATION TO A DISPLAY

(75) Inventors: Tomoo Kimura, Kanagawa (JP); Ryouta Hata, Fukuoka (JP)

(73) Assignee: Panasonic Corporation, Osaka (JP)

( * ) Notice: Subject to any disclaimer, the term of this patent is extended or adjusted under 35 U.S.C. 154(b) by 1537 days.

(21) Appl. No.: 11/802,188

(22) Filed: May 21, 2007

(65) Prior Publication Data

US 2007/0273709 A1  Nov. 29, 2007

(30) Foreign Application Priority Data

May 24, 2006 (JP) ................................. 2006-143843

(51) Int. Cl.
*G09G 5/00* (2006.01)
*G06T 11/60* (2006.01)
*G06T 15/30* (2011.01)
*G06T 11/40* (2006.01)

(52) U.S. Cl.
CPC .................. *G06T 11/60* (2013.01); *G06T 15/30* (2013.01); *G06T 11/40* (2013.01)
USPC ........... 345/619; 345/629; 345/419; 345/427; 382/232; 382/233; 382/165; 382/166

(58) Field of Classification Search
CPC ............ G06T 11/60; G06T 15/30; G06T 11/40
USPC ......... 382/165, 232–233; 345/619, 419–427, 345/629
See application file for complete search history.

(56) References Cited

U.S. PATENT DOCUMENTS

| | | | |
|---|---|---|---|
| 2003/0007692 A1* | 1/2003 | Chujoh et al. ................. | 382/233 |
| 2003/0012286 A1* | 1/2003 | Ishtiaq et al. ............. | 375/240.27 |
| 2005/0157799 A1* | 7/2005 | Raman et al. ............. | 375/240.27 |
| 2005/0259735 A1* | 11/2005 | Zhu ........................... | 375/240.16 |
| 2006/0227878 A1* | 10/2006 | Mori et al. ................ | 375/240.24 |
| 2007/0009037 A1* | 1/2007 | Yamaguchi et al. ....... | 375/240.16 |
| 2007/0076947 A1* | 4/2007 | Wang et al. .................... | 382/165 |
| 2007/0189606 A1* | 8/2007 | Ciuc et al. ...................... | 382/195 |

FOREIGN PATENT DOCUMENTS

| | | |
|---|---|---|
| JP | 2002-202766 | 7/2002 |
| JP | 2005-241677 | 9/2005 |
| JP | 2005-257854 | 9/2005 |
| JP | 2006-203597 | 8/2006 |

* cited by examiner

*Primary Examiner* — Jin-Cheng Wang
(74) *Attorney, Agent, or Firm* — Wenderoth, Lind & Ponack, L.L.P.

(57) ABSTRACT

An image control device, which achieves energy saving effects without degradation of an image to be displayed, even if image data includes a fault, is configured to decode received image data into an image, generate display information based on the received image data, and output a decoded image and display information. The image control device receives image data, detects errors from the image data. For each error detected, the image control device specifies a fault image region containing an error from an entire image region of the image data, and inhibits use of the fault image region for generating display information that defines an image display condition according to which the display device performs the image display.

14 Claims, 24 Drawing Sheets

FIG. 3

| Data Sequence | Data Portion (hex) | Parity Bit (bin) | Function |
|---|---|---|---|
| 1 | 1FFF | 1 | Start of Frame |
| 2 | 00BB | 0 | Start of Macroblock 1 |
| 3 | xxxx | p0 | Data |
| 4 | xxxx | p1 | Data |
| 5 | xxxx | p2 | Data |
| 6 | .. | .. | .. |
| .. | .. | .. | .. |
| x | BB00 | px | End of Macroblock 1 |
| x+1 | 00BB | px+1 | Start of Macroblock 2 |
| x+2 | xxxx | px+2 | Data |
| .. | .. | .. | .. |
| y | BB00 | py | End of Macroblock m-1 |
| y+1 | 00BB | py+1 | Start of Macroblock m |
| y+2 | xxxx | py+2 | Data |
| .. | .. | .. | .. |
| n-1 | BB00 | 0 | End of Macroblock m |
| n | FFF1 | 1 | End of Frame B |

Under Normal Control

| LCD Image | Auxiliary Light | Final Display Image |
|---|---|---|
| <br>Maximum<br>Luminance 60 | <br>Auxiliary Light<br>Intensity 100% | <br>Finale Image |

Example of Backlight Control

| LCD Image | Auxiliary Light | Final Display Image |
|---|---|---|
| <br>Maximum<br>Luminance 80 | <br>Auxiliary Light<br>Intensity 60% | <br>Finale Image<br>(with BL Control) |

No Feature Extraction throughout Entire Frame Region

No Feature Extraction from Any Macroblocks Containing Errors

No Feature Extraction from Any Lines Containing Errors

No Feature Extraction from Any Regions Containing Errors

Display Image

→ Time (Display Sequence)

Feature (Display Image Correction Value/Backlight Control Value)

IMAGE CONTROL DEVICE AND IMAGE DISPLAY SYSTEM FOR GENERATING AN IMAGE TO BE DISPLAYED FROM RECEIVED IMAGED DATA, GENERATING DISPLAY INFORMATION BASED ON THE RECEIVED IMAGE DATA AND OUTPUTTING THE IMAGE AND THE DISPLAY INFORMATION TO A DISPLAY

This application is based on an application No. 2006-143843 filed in Japan, the content of which is hereby incorporated by reference.

BACKGROUND OF THE INVENTION (1) Field of the Invention

The present invention relates to a device and method for controlling image display. The present invention especially relates to a display control technique for use by an image display apparatus that displays images by casting light from a light source onto a reflection-type display device, typified by an liquid crystal panel. According to the display control technique, the light source intensity is dynamically adjusted in relation to the correction of display image contents.

(2) Description of the Related Art

The following technique is disclosed regarding an image display apparatus that displays images on a liquid crystal panel. According to the disclosure, pixel data is attached with an error-detecting bit and an image display apparatus detects and corrects any errors in pixel data before display. Consequently, it is ensured that correct images are displayed (See Patent Document 1).

According to Patent Document 1, error correction is made on a pixel-by-pixel basis of display images generated. Thus, the error correction disclosed in Patent Document 1 is applicable to correct faults occurred in display images being transmitted on the path up to the image output unit. As a result of the correction, originally generated display images are recovered.

Another technique is disclosed regarding an image display apparatus that displays images on a liquid crystal panel. The technique aims to reduce the power consumption of a light source as well as to achieve the longevity of the display device. According to the disclosure, the adjustment values of the light source intensity are controlled in relation to the correction values of display images, with reference to various parameters including display images and readings of light and temperature sensors. As a result, power saving and extension of the device life is achieved (See Patent Document 2).

According to Patent Document 2, a correlation table is used to determine the adjustment values of the light source intensity and the correction values of display images, based on the features of the entire region of each display image, more specifically, the maximum, minimum and average values of luminance signals.

According to Patent Documents 1 and 2, it is ensured that if a fault occurs in a display image on an output path, a feature is extracted from the entire region of the display image having been corrected. Thus, the extracted features are more accurate than features extracted from display images without correction.

Usually, display images are compressed according to an image compression technique such as MPEG-2/4 or JPEG. An image display device receives compressed data from the outside and decodes the received compressed data to generate display images.

In the above process, the image display device according to Patent Document 1 conducts no processing for correcting decoding faults that may occur at the time of decoding compressed data or for correcting communication faults that may occur at the time of receiving the compressed data. That is to say, the generated display images may involve faults remain uncorrected.

For this reason, even in view of Patent Documents 1 and 2 in combination, there still is the following setback. If some kind of fault has occurred at the time of receiving or decoding compressed data, features are extracted from display images containing the faults. Thus, accurate features cannot be extracted. That is to say, the extracted features are incorrect. As a result, the processing for adjusting the light source intensity and the correction of display images are carried out based on the incorrect features. This may cause that the image quality is notably degraded or that the light source intensity is uselessly increased to cancel out the power savings. In addition, since the feature extraction is conducted on an entire region of each display image, the processing load is relatively heavy. In addition, if the display image involves a fault, the correction cannot be carried out appropriately.

In view of the above problem, the present invention aims to provide an image control device and an image display system that achieves energy savings without causing degradation of display images, even if image data contains a fault.

Patent Document 1: JP Patent Application Publication No. 2005-257854

Patent Document 2: JP Patent Application Publication No. 2002-202766

SUMMARY OF THE INVENTION

In order to achieve the above aim, the present invention provides an image control device for generating (i) an image to be displayed from received image data and (ii) display information based on the received image data, and outputting the image and the display information to a display device. The display information defines a display condition according to which the display device displays the image. The image control device includes: a receiving unit operable to receive image data; a detecting unit operable to detect error data from the image data; a specifying unit operable, if the error data is detected, to specify a fault image region that corresponds to the error data from an entire image region represented by the image data; and a control unit operable to inhibit use of the fault image region for generating display information that defines a display condition according to which the display device performs the image display.

With the above configuration, the image control device does not use any fault image regions for the feature extraction, so that accurate display information is generated. Thus, the image control device prevents degradation of display images and also prevents loss of energy saving effect, even if the display image contains one or more faults.

The control unit may include: an extracting unit operable to extract a feature from an image region remaining after excluding the fault image region; and an output unit operable to generate the display information based on the extracted feature and to output the generated display information to the display device.

With the above configuration, the image control device extracts a feature from a region of the display image other than fault image regions, so that an accurate feature is extracted. Since the image control device extracts an accurate feature even if the display image contain one or more faults, degradation of display images is prevented and loss of energy saving effect is prevented as well.

The image data may include a plurality of macroblocks. The detecting unit may perform the error detection separately on each macroblock. The specifying unit may specify, as the fault image region, a macroblock in which the error data is detected.

With the above configuration, the image control device determines, as a fault image region, a macroblock in which a fault is detected. Thus, the region of a display image not subjected the feature extraction is kept to a minimum.

The image data may include a plurality of macroblocks. The detecting unit may perform the error detection separately on each macroblock. The specifying unit may specify, as the fault image region, a predetermined are a including a macroblock in which the error data is detected.

With the above configuration, the image control device determines, as a fault image region, a predetermined are a of a display image that includes a macroblock from which a fault is detected. Generally, if a fault is detected in a macroblock, a region of a display image corresponding to the macroblock cannot be displayed accurately. In addition, it is naturally expected that regions adjacent to the macroblock may be adversely affected in image quality, for example. In view of this, the image control device described above excludes the predetermined are a including the macroblock from the region to be used for the feature extraction. It is thus ensured that a feature is extracted only from a region of the display image that is free from influence of the fault included in the macroblock.

The predetermined are a may be a horizontally extending region including the macroblock in which the error data is detected. The specifying unit may specify the horizontal region as the fault image region.

With the above configuration, the image control device judges that a horizontal region including a macroblock in which a fault is detected is susceptible to influence of the fault included in the macroblock and excludes the horizontal region from the region for the feature extraction.

A horizontal region may be one horizontal line of an image generated from the image data. The specifying unit may specify, as the fault image region, one horizontal line including the macroblock in which the error data is detected.

With the above configuration, the image control device determines, as the horizontal region, one horizontal line of a display image that includes a macroblock in which a fault is detected and excludes the horizontal region from the region for the feature extraction.

The predetermined are a may be a vertically extending region including the macroblock in which the error data is detected. The specifying unit may specify, as the fault image region, the vertical region including the macroblock in which the error data is detected.

With the above configuration, the image control device determines that a vertical region including a macroblock in which a fault is detected is susceptible to influence of the fault included in the macroblock and excludes the vertical region from the region for the feature extraction.

A vertical region may be one vertical line of an image generated from the image data. The specifying unit may specify, as the fault image region, one vertical line including the macroblock in which the error data is detected.

With the above configuration, the image control device determines, as the vertical region, one vertical line that includes a macroblock in which a fault is detected and excludes the horizontal region from the region for the feature extraction.

The predetermined are a may be a region enclosed to surround the macroblock in which the error data is detected. The specifying unit may specify the enclosed region as the fault image region.

With the above configuration, the image control device determines that a region enclosed to surround a macroblock in which a fault is detected is susceptible to influence of the fault included in the macroblock and excludes the enclosed region from the region for feature extraction.

The control unit may further include: a storage unit operable to store a previous feature that is a feature of display image to be displayed previously to the image data currently processed; and a selecting unit operable to judge whether or not the current feature extracted from the current image data by the extracting unit is valid, and to select the current feature if the current feature is judged to be valid and to select the previous feature if the current feature is judged to be invalid. The output unit may generate the display information based on the feature selected by the selecting unit.

With the above configuration, the image control device judges whether the current feature, which is of the currently processed image data, is valid or invalid. The image control device then selects either of the current and previous features according to the judgment. The amount of auxiliary light to be emitted is determined according to the selected feature.

The following describes advantages obtained by making such a selection of between current and previous features.

In the case where a fault image region specified by the image control device is relatively large, the remaining region from which a feature is extracted becomes relatively small. A feature extracted from a small region of an image may indicate a value that is abruptly changed from a previously detected feature and may not be highly reliable. Such a feature should not be determined to be valid. Display control based on such an unreliable feature results in screen flickering on the display device.

Generally, current image data and previous image data does not differ much in display content. Thus, it is effective to use the previous feature, which is extracted from the previous image data, rather than the unreliable current feature, which is extracted from the current image data. In this way, it is avoided to conduct display control based on the abruptly changed features, so that screen flickering is prevented.

The selecting unit may compare a threshold determined by a difference between the previous and current features with a size of the region from which the current feature is extracted. The current feature may be judged to be valid if the region-size is larger than or equal to the threshold and to be invalid if the region size is smaller than the threshold.

With the above configuration, the image control device judges whether the current feature is valid or not with use of the threshold and the size of the image region from which the current feature is extracted.

The receiving unit may sequentially receive a plurality of pieces of image data. The image control device may further include: a light amount calculating unit operable to calculate, from a feature of each piece of image data, an amount of light to be emitted by an auxiliary light; a timer; and a fault monitoring unit operable to (i) monitor, by using the timer, a fault duration for which two or more pieces of image data each containing error data have been successively received, and (ii) control, if the fault duration exceeds a predetermined time period, the calculation performed by the light amount calculating unit so that an image generated from each piece of image data containing error data is displayed with a reduced power. The fault monitoring unit may activate the timer to start the monitoring, upon finding that error data is detected while the timer is inactive.

With the above configuration, the image control device monitors the fault duration, so that the image control device is informed of whether image data containing a fault is continuously received. If image data containing a fault is continuously received, the image control device controls the light amount calculation so as to reduce power consumption at the time of displaying images decoded from such image data. Thus, useless power consumption is reduced.

If the fault duration exceeds the predetermined time period, the fault monitoring unit may control the light amount calculating unit so as to cause the auxiliary light to be turned off.

With the above configuration, if image data containing a fault is continuously received longer than the predetermined time period, the image control device causes the auxiliary light to be turned off when displaying images decoded from the image data. As a result, useless power consumption is reduced.

If the fault duration exceeds the predetermined time period, the fault monitoring unit may control the light amount calculating unit so as to reduce a value of the calculated amount of light.

With the above configuration, if image data containing a fault is continuously received longer than the predetermined time period, the image control device further reduces the calculated amount of auxiliary light to be emitted at the time when images decoded from the image data are displayed. As a result, useless power consumption is reduced.

The receiving unit may sequentially receive a plurality of pieces of image data. The image control device may further include: a light amount calculating unit operable to calculate, from a feature of the image data, an amount of light to be produced by an auxiliary light; a counter; and a fault monitoring unit operable to (i) count, by using the counter, a number of successively received pieces of image data each containing error data and (ii) control the calculation performed by the light amount calculating unit if the count exceeds a predetermined number. The fault monitoring unit may cause the counter to start the counting upon finding that error data is detected from image data while the counter is in an initial state in which no counting is being conducted.

With the above configuration, the image control device is informed of whether image data containing a fault is continuously received, with the use of counter. Thus, if image data containing a fault is continuously received, the calculation of the amount of light is so controlled that the power consumption for displaying images decoded from the image data are displayed. As a result, useless power consumption is reduced.

The specifying unit may specify the entire image region of the image data as the fault image region.

With the above configuration, the image control device does not extract a feature from the entire region of image data, so that the processing load that would otherwise be imposed for the feature extraction is reduced.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 3 illustrates an exemplary image signal;

DESCRIPTION OF THE PREFERRED EMBODIMENT

The following describes embodiments of the present invention, with reference to the accompanying drawings.

1. First Embodiment

The following describes an image display system 1 according to a first embodiment of the present invention.

Figure 1:
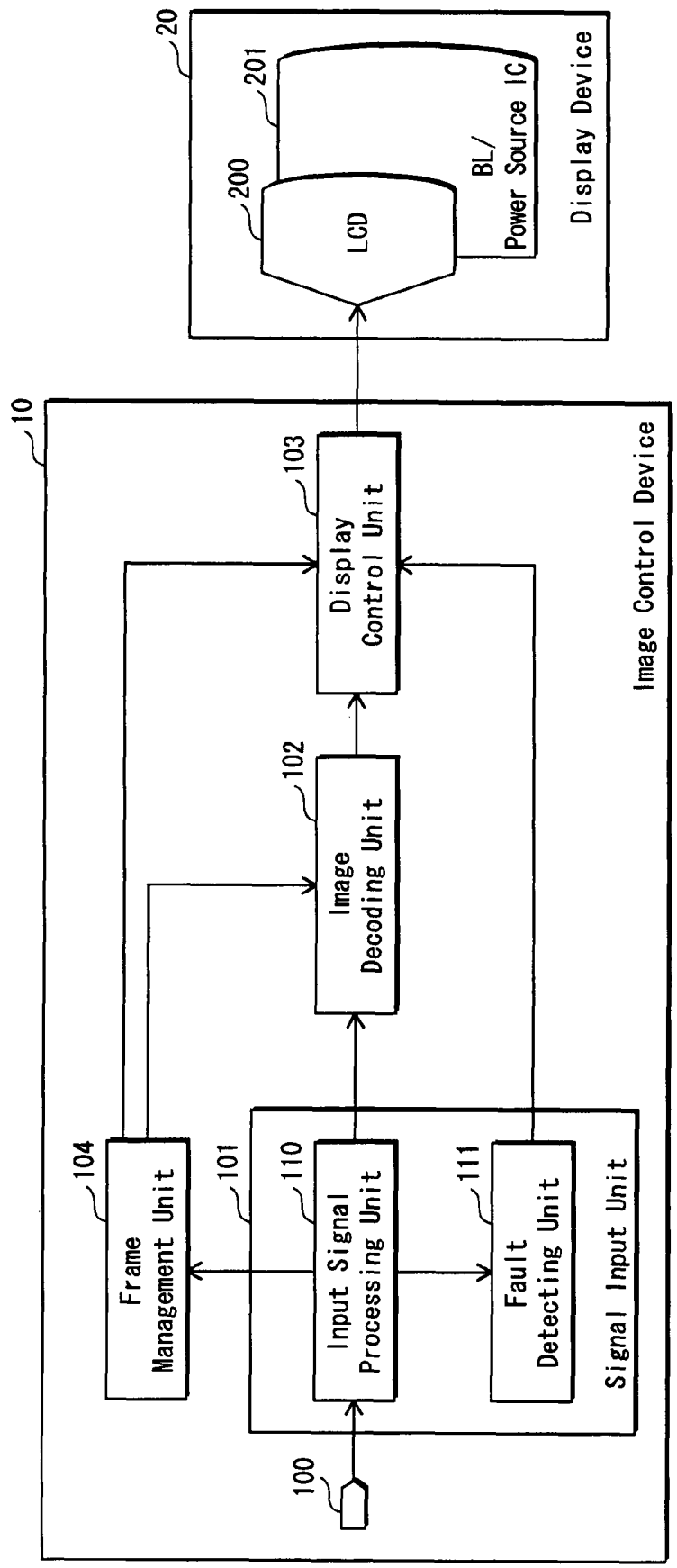
FIG. 1 is a block diagram diagrammatically illustrating an image display system 1.

As illustrated in FIG. 1, the image display system 1 is generally composed of an image control device 10 and a display device 20.

The image control device 10 receives an image signal (image data) from the outside, generates a display image from the received image signal, and outputs the generated display image to the display device 20, along with a correction value of the display image and an intensity value of auxiliary light to be emitted. The correction value is a luminance value at which the display image is to be displayed. In the following description, a display image may also be referred to as a frame.

The display device 20 is generally composed of an LCD (Liquid Crystal Display) 200 and a BL (backlight)/power source IC 201. The display device 20 receives a display image from the image control device 10 along with a correction value of the display image and an intensity value of auxiliary light, and displays the display image according to the received correction value and intensity value.

1.1 Structure of Image Control Device 10

The following describes the structure of the image control device 10.

As illustrated in FIG. 1, the image control device 10 is generally composed of an input terminal 100, a signal input unit 101, an image decoding unit 102, a display control unit 103, and a frame management unit 104.

(1) Signal Input Unit 101

Figure 2:
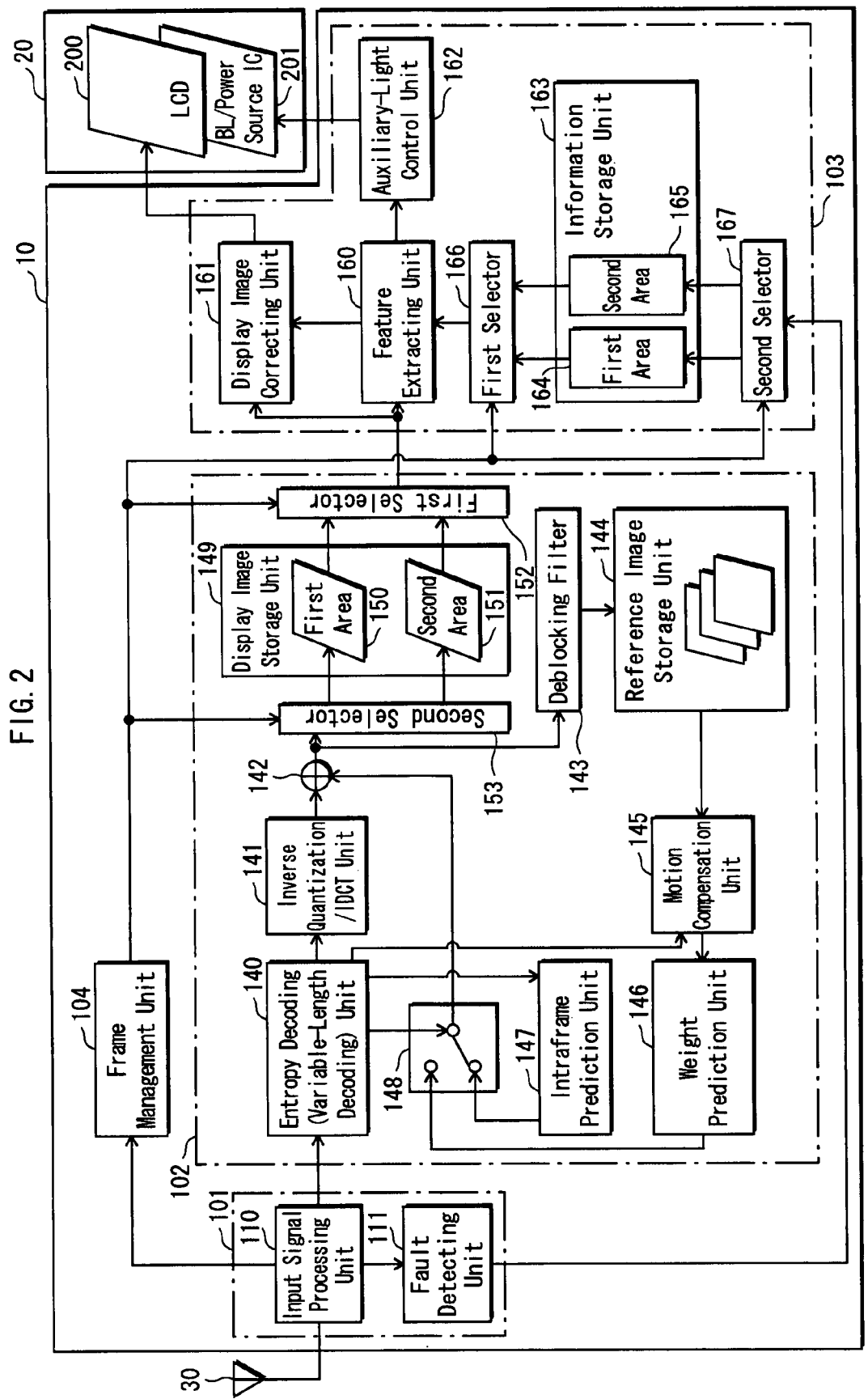
FIG. 2 is a block diagram illustrating the structure of an image control device 10 and a display device 20.

As illustrated in FIGS. 1 and 2, the signal input unit 101 is generally composed of an input signal processing unit 110 and a fault detecting unit 111.

The input signal processing unit 110 receives an image signal, which is a digital signal, from an antenna 30 via the input terminal 100. The input signal processing unit 110 converts the received image signal into a format supported by the image decoding unit 102 and outputs the converted signal to the image decoding unit 102.

FIG. 3 illustrates an exemplary image signal. The image signal carries a plurality of data portions (hex) each paired with a parity bit (bin). Hereinafter, each pair of a data portion and a parity bit is referred to as an input signal. A data portion is composed of 16-bit data (in hexadecimal representation, in this example), where as a parity bit is a one-bit value representing an even parity bit of a corresponding data portion. In addition, each image signal starts with a start code indicating the beginning of a frame (1FFF) and ends with an end code indicating the end of the frame (FFF1). Between the start and end codes, macroblock data worth one full screen image is contained (from macroblock 1 to macroblock m, in this example). Each macroblock data is carried by a plurality of input signals. An input signal carrying the start of a macroblock includes data indicating the start of the macroblock (00BB), where as an input signal carrying the end of the macroblock includes data indicating the end of the macroblock (BB00). Thus, a plurality of pieces of data received between (00BB) and (BB00) constitute one macroblock.

The input signal processing unit 110 sequentially receives input signals from the antenna 30 via the input terminal 100 one by one. That is, the input signal processing unit 110 sequentially receives input signals in the order illustrated in FIG. 3.

The fault detecting unit 111 detects whether or not a fault has occurred in a received image signal. If a fault is detected, the fault detecting unit 111 notifies the display control unit 103 that a fault is detected.

Generally, macroblocks are contained in an image signal in form of compression coded data (compressed image data).

The following describes the signal input unit 101 in detail.

Figure 4:
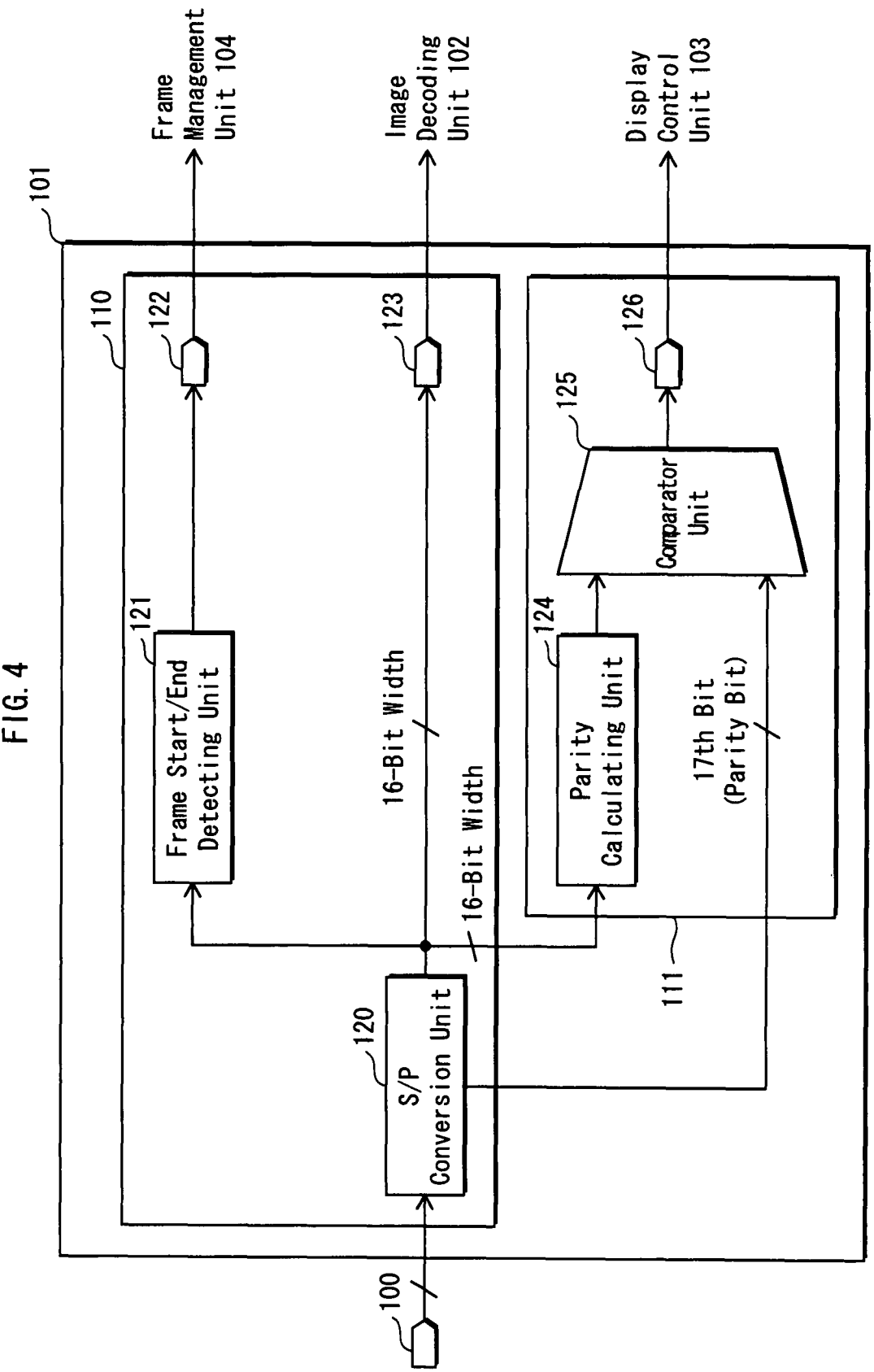
FIG. 4 is a block diagram illustrating the structure of a signal input unit 101.
Figure 5A:
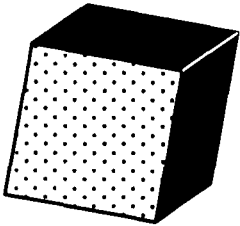
FIG. 5 illustrate an example of display control carried out based the correlation between adjustment of light source intensity and correction of a display image.
Figure 5A:
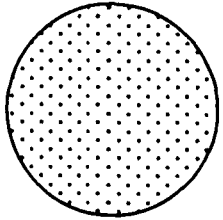
Figure 5A:
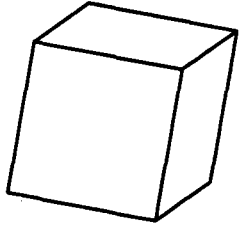
Figure 5B:
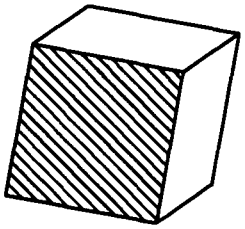
Figure 5B:
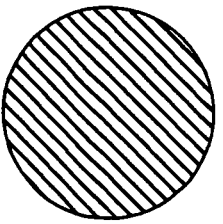
Figure 5B:
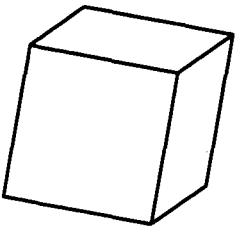

As illustrated in FIG. 4, the signal input unit 101 is generally composed of an S/P (serial/parallel) conversion unit 120, a frame start/end detecting unit 121, output terminals 122 and 123, a parity calculating unit 124, a comparator unit 125, and an output terminal 126.

The input signal processing unit 110 mentioned above is generally composed of the S/P conversion unit 120, the frame start/end detecting unit 121, and the output terminals 122 and 123. The fault detecting unit 111 is generally composed of the parity calculating unit 124, the comparator unit 125, and the output terminal 126.

(1-1) S/P Conversion Unit 120

The S/P conversion unit 120 sequentially converts the received input signals into signals of a parallel format.

The S/P conversion unit 120 sequentially outputs data portions contained in the parallel format input signals (i.e., first 16 bits of each input signal) to the image decoding unit 102 via the output terminal 123. The S/P conversion unit 120 also outputs the data potions to the frame start/end detecting unit 121 and the parity calculating unit 124.

In addition, the S/P conversion unit 120 outputs the parity bits (i.e., the last 1 bit of each input signal) to the comparator unit 125.

(1-2) Frame Start/End Detecting Unit 121

The frame start/end detecting unit 121 detects a transition between adjacent frames from the received image signals.

The frame start/end detecting unit 121 receives a 16-bit signal from the S/P conversion unit 120 and judges whether the received signal represents a start code indicating the start of an image signal.

When judging that the received signal represents a start code, the frame start/end detecting unit 121 outputs transition detection information to the frame management unit 104 via the output terminals 122. The transition detection information indicates that a display image is changed to a next display image. After output of transition detection information, the frame start/end detecting unit 121 goes into a stand-by mode for receiving a subsequent signal.

When judging that the received signal does not represent a start code, the frame start/end detecting unit 121 goes into the stand-by mode for receiving a subsequent signal.

(1-3) Parity Calculating Unit 124

The parity calculating unit 124 receives data from the S/P conversion unit 120 and calculates the number of even bits included in the received data for parity check, and outputs the calculation result to the comparator unit 125.

(1-4) Comparator Unit 125

The comparator unit 125 receives a parity bit from the S/P conversion unit 120.

The comparator unit 125 receives the calculation result from the parity calculating unit 124 and compares the calculation result received from the parity calculating unit 124 with the parity bit received from the S/P conversion unit 120 to check the validity of the received data. In this example, the comparator unit 125 confirms the validity of data if the calculation result matches the parity bit.

If the calculation result does not match the parity bit, the comparator unit 125 outputs fault notification information to the display control unit 103 via the output terminal 126. The fault notification information indicates that a fault is detected in the received image signal. The comparator unit 125 then proceeds for comparison on data carried by a subsequent input signal.

(2) Image Decoding Unit 102

The image decoding unit 102 decodes image data (macroblocks) having been compression coded according to the H.264/MPEG-4 AVC standard to generate a display image.

As illustrated in FIG. 2, the image decoding unit 102 is generally composed of an entropy decoding (variable-length decoding) unit 140, an inverse quantization/IDCT unit 141, an adder unit 142, a deblocking filter 143, a reference image storage unit 144, a motion compensation unit 145, a weight prediction unit 146, an intraframe prediction unit 147, a switch 148, a display image storage unit 149, and first and second selectors 152 and 153.

Since the above component units fall within the scope of the state-of-the-art and are already known, the description of those component units is omitted.

The display image storage unit 149 has first and second are as 150 and 151.

Each of the first and second are as 150 and 151 has an are a for storing a display image generated by the image decoding unit 102.

One of the first are a 150 and the second are a 151 is alternately connected by the first selector 152 to the display control unit 103, and the other one is alternately connected by the second selector 153 to the adder unit 142.

The first selector 152 receives from the frame management unit 104 an instruction for switching the connection. On receiving the switching instruction, the first selector 152 switches one of the are as that is currently being connected to the display control unit 103 to the other are a. Suppose, for example, the first selector 152 receives a switching instruction from the frame management unit 104 in the state where the first are a 150 is connected to the first selector 152. In response to the switching instruction, the first selector 152 disconnects the first are a 150 and connects the second are a 151 instead.

On receiving a switching instruction from the frame management unit 104, the second selector 153 switches one of the are as currently being connected to the adder unit 142 to the other are a. Suppose, for example, the second selector 153 receives a switching instruction from the frame management unit 104 in the state where the second are a 151 is connected to the second selector 153. In response to the switching instruction, the second selector 153 disconnects the second are a 151 and connects the first are a 150 instead.

Each time the connection is switched, the adder unit 142 stores a generated display image into the are a connected by the second selector 153.

(3) Display Control Unit 103

As illustrated in FIG. 2, the display control unit 103 is composed of a feature extracting unit 160, a display image correcting unit 161, an auxiliary-light control unit 162, an information storage unit 163, and first and second selectors 166 and 167.

(3-1) Information Storage Unit 163

The information storage unit 163 includes first and second are as 164 and 165.

Each of the first area 164 and the second area 165 has an area for storing fault notification information output from the fault detecting unit 111.

One of the first and second are as 164 and 165 is alternately connected by the first selector 166 to the feature extracting unit 160, and the other one is connected alternately by the second selector 167 to the fault detecting unit 111.

(3-2) First and Second Selectors 166 & 167

On receiving a switching instruction from the frame management unit 104, the first selector 166 switches the connection, so that one of the are as currently connected to the feature extracting unit 160 is switched to the other are a. Suppose, for example, the first selector 166 receives a switching instruction from the frame management unit 104 in the state where the first are a 164 is connected to the first selector 166. In response to the switching instruction, the first selector 166 disconnects the first are a 164 and connects the second are a 165 instead.

On receiving a switching instruction from the frame management unit 104, the second selector 167 switches the connection, so that one of the are as currently connected to the fault detecting unit 111 is switched to the other are a. Suppose, for example, the second selector 167 receives a switching instruction from the frame management unit 104 in the state where the second are a 165 is connected to the second selector 167. In response to the switching instruction, the second selector 167 disconnects the second are a 165 and connects the first are a 164 instead.

(3-3) Feature Extracting Unit 160

The feature extracting unit 160 acquires a display image to be presented from one of the are as currently connected to the first selector 152 of the image decoding unit 102.

The feature extracting unit 160 judges whether or not the are a currently connected to the first selector 166 stores one or more pieces of fault notification information.

If it is judged that no fault notification information is stored, the feature extracting unit 160 extracts a feature from the entire region of the display image and outputs the extracted feature to the display image correcting unit 161 as well as to the auxiliary-light control unit 162.

On the other hand, if it is judged that fault notification information is stored, the feature extracting unit 160 excludes the entire region of the display image from the region for the feature extraction. Thus, no feature extraction is conducted on the acquired display image. Here, the feature extracting unit 160 outputs non-extraction information indicating that no feature extraction is conducted, to the display image correcting unit 161 and the auxiliary-light control unit 162.

In this specification, a feature refers to an average luminance of a display image calculated on a region free from fault. For example, the feature extracting unit 160 extracts, from a display image, a macroblock with the highest luminance and a macroblock with a lowest luminance out of a plurality of macroblocks that are free from any fault and calculates the average of the highest and lowest luminance as the feature of the display image.

Note that details of the feature extraction are given in Patent Document 2, so that no further description is given here.

Note that the average luminance is extracted as a feature merely by way of example and without limitation. The feature may be the highest luminance instead.

(3-4) Display Image Correcting Unit 161

The display image correcting unit 161 acquires a display image to be presented, from one of the are as currently connected to the first selector 152 of the image decoding unit 102.

Upon receiving non-extraction information from the feature extracting unit 160, the display image correcting unit 161 generates first non-calculation information indicating that the luminance value is not calculated, and outputs the display image along with the first non-calculation information to the display device 20.

Upon receiving non-extraction information from the feature extracting unit 160, the display image correcting unit 161 generates first non-calculation information indicating that the luminance value is not calculated, and outputs the display image along with the first non-calculation information to the display device 20.

Note that details of the luminance calculation based on a feature of a display image are given in Patent Document 2, so that no further description is given here.

(3-5) Auxiliary-Light Control Unit 162

Upon receiving a feature from the feature extracting unit 160, the auxiliary-light control unit 162 calculates the intensify value of auxiliary light to be emitted, based on the received feature. The auxiliary-light control unit 162 outputs the calculated intensity value to the display device 20.

On receiving non-extraction information from the feature extracting unit 160, the auxiliary-light control unit 162 outputs second non-calculation information to the display device 20. The second non-calculation information indicates that the intensity value is not calculated.

Note that details of the calculation of auxiliary light intensity based on a feature of a display image are given in Patent Document 2, so that no further description is given here.

(4) Frame Management Unit 104

On receiving transition detection information from the frame start/end detecting unit 121, the frame management unit 104 outputs a switching instruction to the first and second selectors 152 and 153 of the image decoding unit 102 as well as to the first and second selectors 166 and 167 of the display control unit 103.

With the above operation, the are a for storing a display image is alternated between the two are as on a frame-by-frame basis. Similarly, the are a for storing fault notification information is alternated between the two are as on a frame-by-frame basis.

1.2 Display Device 20

As illustrated in FIGS. 1 and 2, the display device 20 is generally composed of the LCD 200 and the BL/power source IC 201.

The LCD 200 is a liquid crystal panel per se. On receiving a display image and the luminance value from the display image correcting unit 161, the LCD 200 presents the received display image according to the received luminance value. On receiving first non-calculation information and a display image, the LCD 200 presents the received display image according to the original luminance value of the display image.

The BL/power source IC 201 is generally composed of an auxiliary light, i.e., a backlight (BL) and a power source IC that supplies necessary power for illumination to the auxiliary light.

On receiving the intensity value from the auxiliary-light control unit 162, the BL/power source IC 201 adjusts the brightness of the backlight based on the received intensity value.

On receiving second non-calculation information from the auxiliary-light control unit 162, the BL/power source IC 201 adjusts the brightness of the BL based on a predetermined intensity value (e.g. such a value for causing illumination at the 100% intensity).

The following briefly describes the adaptive control carried out based on the correlation between the adjustment of the light source intensity and the correction of the display image, with reference to FIG. 5. FIG. 5A illustrates an LCD image, the state of auxiliary light, and the final display image, under normal control (i.e., without correction conversion processing). The term "LCD image" refers to an image produced on a reflection type display, i. e., a liquid crystal panel, according to the present invention. The aperture ratio of the crystals is determined accordingly to the contents of an LCD image and the final display image is produced by irradiating the liquid crystal panel with auxiliary light. Generally, a low-pass filter or a histogram is employed to extract the highest luminance value from the entire LCD image. Based on the extracted highest luminance value, the LCD image is corrected and the backlight brightness is adjusted to produce the final display image. It is also applicable to extract the average luminance value as in the present embodiment. Under the normal control illustrated in FIG. 5A, the display image, i.e., the LCD image has the heist luminance value of 60, and the amount of auxiliary light is caused to emit light at 100% of its intensity. In this case, the adjustment is made as illustrated in FIG. 5B to increase the LCD luminance to 80 at the highest and to reduce the auxiliary light intensity to 60%. With this control, even if the auxiliary light intensity is lowered, a comparable final display image is produced. That is, the power consumption is reduced without causing any image degradation. According to the present embodiment, the feature extracting unit 160 extracts a feature of a display image, and the extracted feature is supplied to the display image correcting unit 161 and the auxiliary-light control unit 162 where the luminance value and the intensity value are calculated, respectively. The display device 20 presents the display image according to the calculated luminance value and the calculated intensity value.

It should be noted here that the term "liquid crystal panel" refers to any reflection-type display devices, including full-transparent type and semi-transparent type.

1.3 Operation of Image Control Device 10

The following describes operation of the image control device 10.

Note that decoding of display images performed by the image decoding unit 102 is known in the art, so that no further description is given here.

The following describes the fault detection processing performed by the signal input unit 101 and the correction processing performed by the display control unit 103.

(1) Fault Detection Processing

Figure 6:
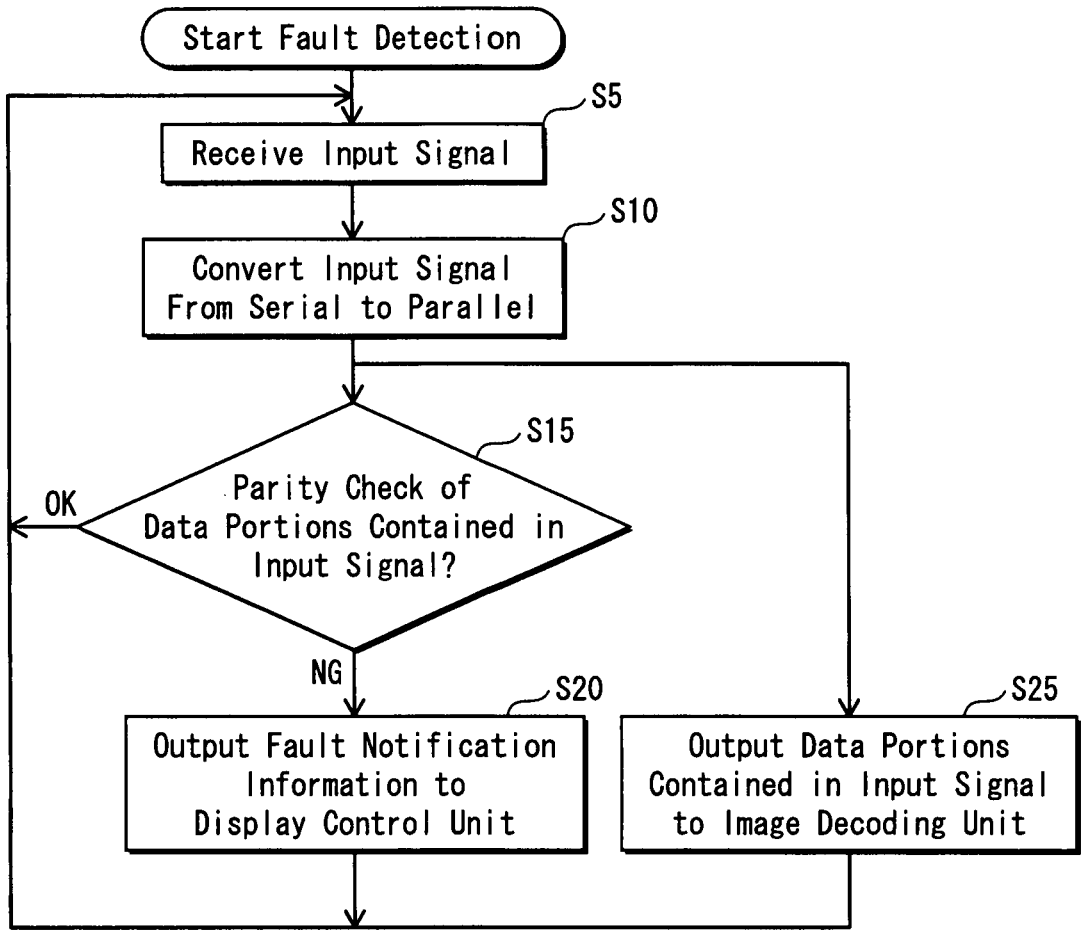
FIG. 6 is a flowchart of fault detection processing performed by the signal input unit 101.

The following describes the fault detection processing performed by the signal input unit 101, with reference to a flowchart illustrated in FIG. 6.

The S/P conversion unit 120 of the input signal processing unit 110 receives an image signal from the antenna 30 via the input terminal 100 (Step S5), sequentially converts input signals included in the received image signal into a parallel format one by one (Step S11, and sequentially outputs data portions carried in the converted input signals to the image decoding unit 102 (Step S25).

The comparator unit 125 of the fault detecting unit 111 conducts parity check on the data portion in each input signal to verify that the data portion is correct (Step S15).

If an error is detected in the data portion (Step S15: NG), the comparator unit 125 outputs fault notification information to the display control unit 103 (Step S20).

On the other hand, if no error is detected in the data portion (Step S15: OK), the comparator unit 125 conducts no further processing.

(2) Correction Processing

Figure 7:
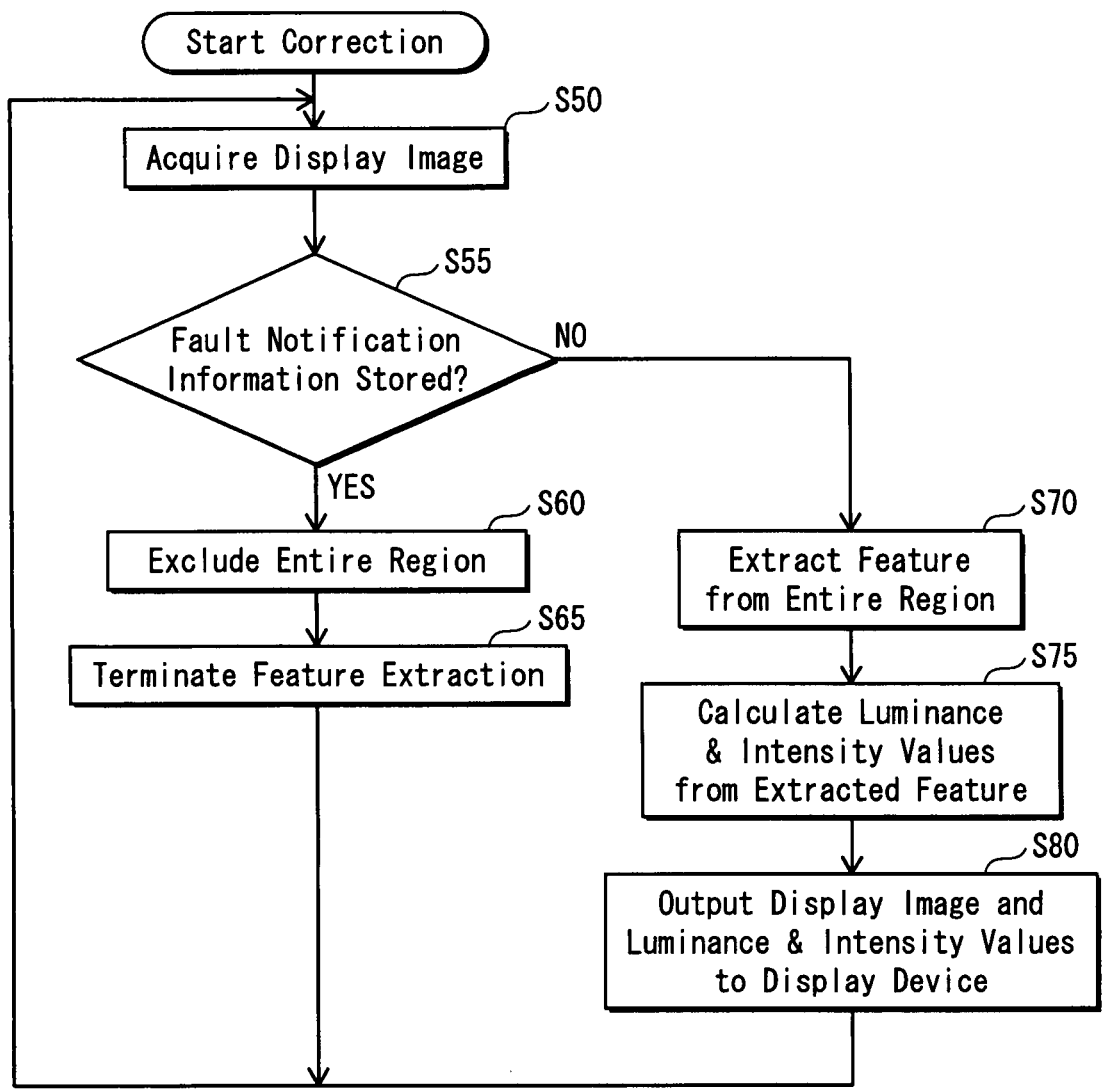
FIG. 7 is a flowchart of correction processing performed by a display control unit 103.

The following describes the correction processing performed by the display control unit 103, with reference to FIG. 7.

The feature extracting unit 160 and the display image correcting unit 161 both of the display control unit 103 each acquire a display image from the image decoding unit 102 (Step S50).

The feature extracting unit 160 judges whether the are a currently connected to the first selector 166 stores one or more pieces of fault notification information (Step S55).

If it is judged that any piece of fault notification information is stored (Step S55: YES), the feature extracting unit 160 exclude the entire region of the display image acquired in Step S50 from the region to be subjected to the feature extraction (Step S60) and terminates the feature extraction processing on the acquired display image (Step S65). At this time, the display image correcting unit 161 outputs first non-calculation information and the display image to the display device 20. In addition, the auxiliary-light control unit 162 outputs second non-calculation information to the display device 20.

If it is judge that no fault notification information is stored (Step S55: NO), the feature extracting unit 160 extracts a feature from the entire region of the acquired display image, and outputs the extracted feature to the display image correcting unit 161 and the auxiliary-light control unit 162 (Step S70). The display image correcting unit 161 calculates the luminance value from the received feature, and the auxiliary-light control unit 162 calculates the intensity value from the received feature (Step S75). The display image correcting unit 161 outputs the calculated luminance value and the display image to the display device 20, where as the auxiliary-light control unit 162 outputs the calculated intensity value to the display device 20 (Step S80).

1.4 Other Modifications

The first embodiment of the present invention is described merely by way of example and without limitation. The present invention may be embodied in various other ways without departing from the gist of the present invention. Various modifications including the following still fall within the scope of the present invention.

(1) According to the above embodiment, the fault detecting unit 111 is described to detect a fault by parity check but without limitation.

The fault detecting unit 111 may detect a fault occurred in an image signal by using CRC (cyclic redundancy check) code.

(2) The above embodiment may be modified so that the auxiliary-light control unit 162 turns off the backlight when a display image containing a fault is displayed. That is, the auxiliary-light control unit 162 may adjust the intensity value to 0% when such a display image is to be displayed.

According to this modification, when it is jugged that fault notification information is stored, the feature extracting unit 160 outputs, to the auxiliary-light control unit 162, a shutoff instruction for causing the backlight intensity to be 0%. On receiving the shutoff instruction from the feature extracting unit 160, the auxiliary-light control unit 162 outputs the intensity value 0% to the display device 20.

(3) According to the above embodiment, the information storage unit 163 as well as the first and second selectors 166 and 167 are described as the component units of the display control unit 103.

However, the above embodiment may be modified, so that the information storage unit 163 as well as the first and second selectors 166 and 167 are not included in the display control unit 103.

According to this modification, the image control device 10 is composed of the signal input unit 101, the image decoding unit 102, the display control unit 103, the information storage unit 163, and the first and second selectors 166 and 167. In addition, the display control unit 103 is composed of the feature extracting unit 160, the display image correcting unit 161, and the auxiliary-light control unit 162.

(4) The above embodiment may be modified so that the fault detecting unit 111 checks the start and end codes only.

According to this modification, the fault detecting unit 111 may detect a fault by parity check as described above. Alternatively, the fault detecting unit 111 may store the start and end codes in advance and detects a fault by checking whether received data is in agreement with the stored codes.

(5) The present invention may be embodied by any combination of the above embodiment with any of the modifications described above.

1.5 Recapitulation of First Embodiment

The display control unit 103 is configured to terminate the feature extraction processing on a display image if the fault detecting unit 111 detects a fault in the display image. The display control unit 103 is configured to extract a feature from an image only if no fault is detected in the display image.

In addition, the auxiliary-light control unit 162 is configured to control the auxiliary light to reduce the amount of light or to be turned off when a display image to be illuminated has not been used for the feature extraction. As a result, the image control device 10 achieves power savings.

2. Second Embodiment

The following describes an image display system 2 according to a second embodiment of the present invention, focusing on differences with the first embodiment.

Figure 8:
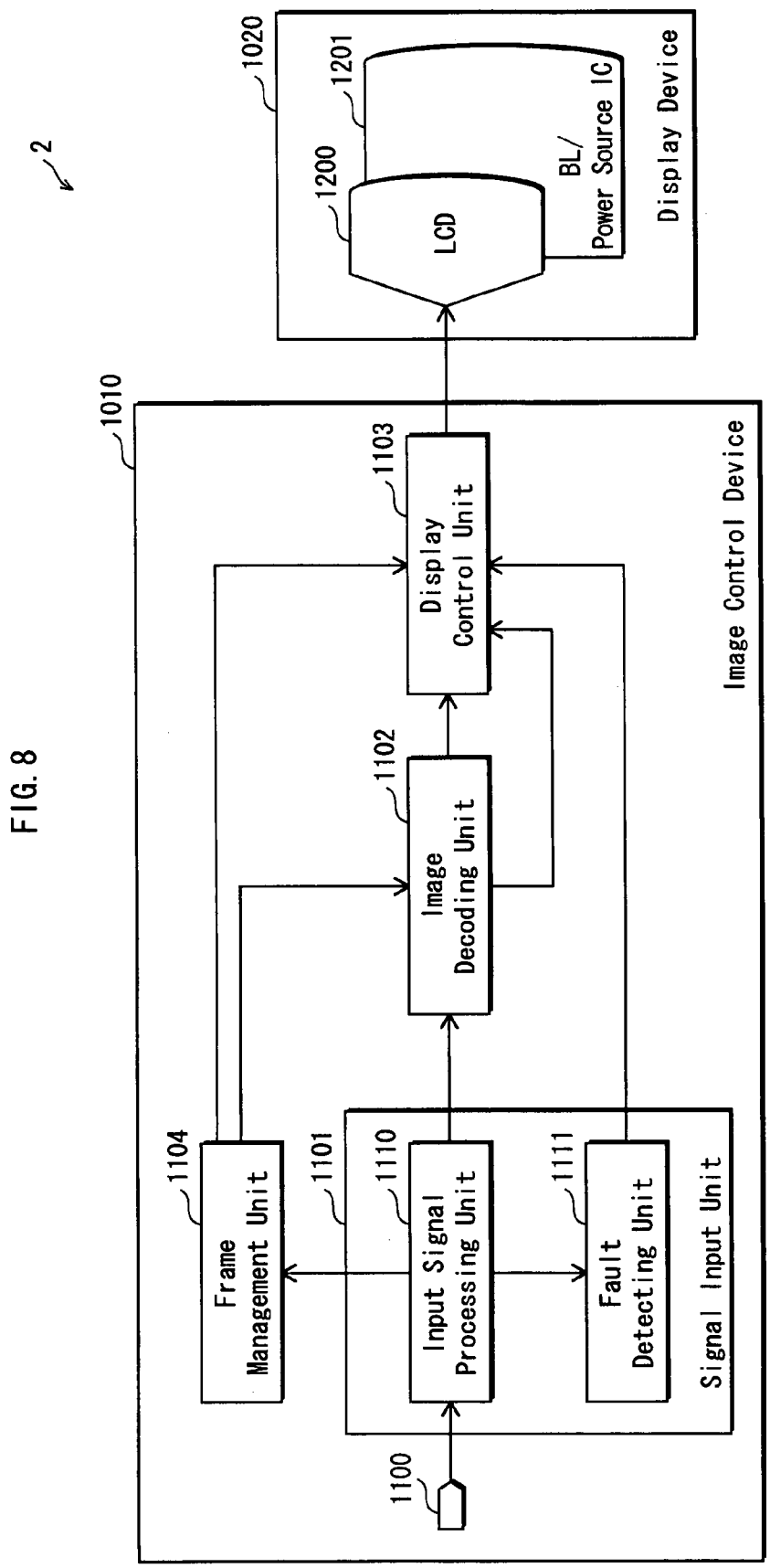
FIG. 8 is a block diagram diagrammatically illustrating an image display system 2.

As illustrated in FIG. 8, the image display system 2 is generally composed of an image control device 1010 and a display device 1020.

The image control device 1010 differs from the image control device 10 with respect to the following. The image control device 10 conducts the fault detection only at the time of image signal input, where as the image control device 1010 additionally conducts the fault detection at the time of image decoding.

Figure 9:
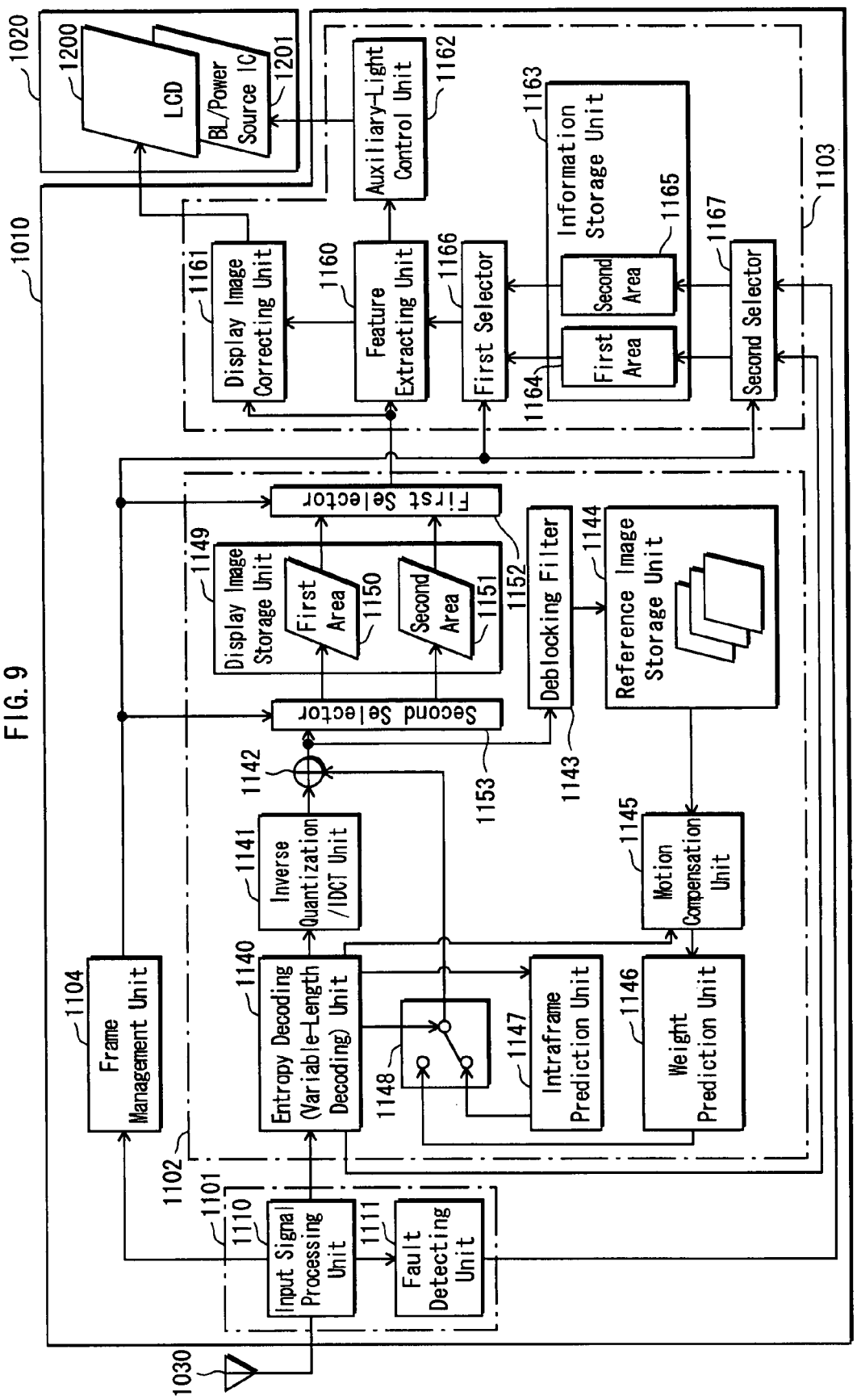
FIG. 9 is a block diagram illustrating the structure of an image control device 1010 and a display device 1020.

As illustrated in FIGS. 8 and 9, the display device 1020 is generally composed of an LCD 1200 and a BL/power source IC 1201. The LCD 1200 and the BL/power source IC 1201 are respectively identical to the LCD 200 and the BL/power source IC 201 described in the first embodiment. Thus, no further description is given here.

The following describes the structure of the image control device 1010.

2.1 Structure of Image Control Device 1010

The following describes the structure of the image control device 1010.

As illustrated in FIG. 8, the image control device 1010 is generally composed of an input terminal 1100, a signal input unit 1101, an image decoding unit 1102, a display control unit 1103, and a frame management unit 1104.

(1) Signal Input Unit 101

As illustrated in FIGS. 8 and 9, the signal input unit 101 is generally composed of an input signal processing unit 1110 and a fault detecting unit 1111, and processes image signal received from an antenna 1030.

The input signal processing unit 1110 is generally composed of component units identical to those of the input signal processing unit 110 described in the first embodiment. In addition, those component units operate basically in the same way as those descried in the first embodiment, except for the bit width of output data of the S/P conversion unit. The S/P conversion unit converts an input signal into 17-bit parallel data and outputs the 17-bit data to the image decoding unit 1102.

The fault detecting unit 1111 is generally composed of component units identical to those of the fault detecting unit 111 described in the first embodiment and operate in the same manner. Thus, no further description is given here.

For convenience in the following description, the fault notification information according to the first embodiment is referred to as first fault notification information.

(2) Image Decoding Unit 1102

The image decoding unit 1102 decodes image data (macroblocks) having been compression coded according to the H.264/MPEG-4 AVC standard to generate a display image.

As illustrated in FIG. 9, the image decoding unit 1102 is generally composed of an entropy decoding (variable-length decoding) unit 1140, an inverse quantization/IDCT unit 1141, an adder unit 1142, a deblocking filter 1143, a reference image storage unit 1144, a motion compensation unit 1145, a weight prediction unit 1146, an intra-image prediction unit 1147, a switch 1148, a display image storage unit 1149, and first and second selectors 1152 and 1153.

The component units other than the entropy decoding unit 1140 operate in the same way as those known in the art or described in the first embodiment. Thus, no description of such component units is given here.

The following describes the entropy decoding unit 1140.

(2-1) Entropy Decoding Unit 1140

The entropy decoding unit 1140 applies variable-length decoding to a macroblock, which is compressed image data, to be processed (decoded). In addition, the entropy decoding unit 1140 conducts parsing (parity check, in this example) on the compressed image data to see if a fault has occurred.

Figure 10:
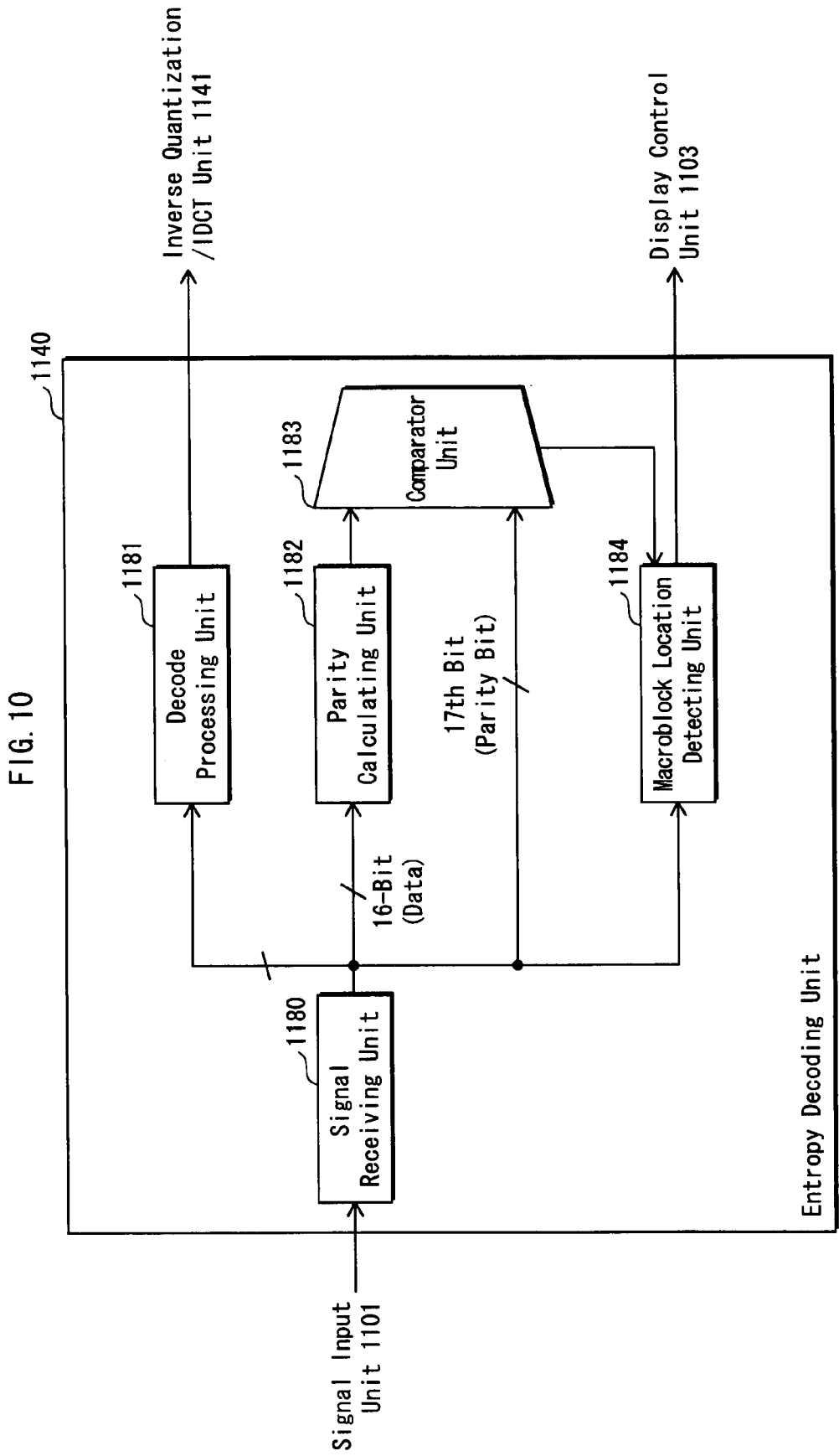
FIG. 10 is a block diagram illustrating the structure of an entropy decoding unit 1140.

As illustrated in FIG. 10, the entropy decoding unit 1140 is generally composed of a signal receiving unit 1180, a decode processing unit 1181, a parity calculating unit 1182, a comparator unit 1183, and a macroblock location detecting unit 1184.

(2-1-1) Signal Receiving Unit 1180

The signal receiving unit 1180 sequentially receives input signals having been converted into the parallel format, from the input signal processing unit 1110 of the signal input unit 1101. The signal receiving unit 1180 then outputs the first 16-bit of each received input signal to each of the decode processing unit 1181, the parity calculating unit 1182, and the macroblock location detecting unit 1184, and also outputs the last one bit, which is the parity bit, of each input signal to the comparator unit 1183.

(2-1-2) Decode Processing Unit 1181

The decode processing unit 1181 applies variable-length decoding to each macroblock, which is compressed image data, to be processed (decoded). That is, the decode processing unit 1181 conducts variable-length decoding separately on the respective macroblocks.

Since the variable-length decoding is known in the art, no further description is given here.

(2-1-3) Parity Calculating Unit 1182

On receiving 16-bit data from the signal receiving unit 1180, the parity calculating unit 1182 calculates the number of even bits included in the received data for parity check, and outputs the calculation result to the comparator unit 1183.

(2-1-4) Comparator Unit 1183

The comparator unit 1183 receives a parity bit from the signal receiving unit 1180.

On receiving the calculation result from the parity calculating unit 1182, the comparator unit 1183 compares the parity bit with the received calculation result to check the validity of the received data. In this example, the comparator unit 1183 confirms the validity of data if the calculation result matches the parity bit.

If the calculation result does not match the parity bit, the comparator unit 1183 outputs fault detection information to the macroblock location detecting unit 1184. The fault detection information indicates that a fault is detected in the currently processed macroblock. The comparator unit 1183 then proceeds to the comparison processing on a subsequent piece of data.

(2-1-5) Macroblock Location Detecting Unit 1184

Figure 11:
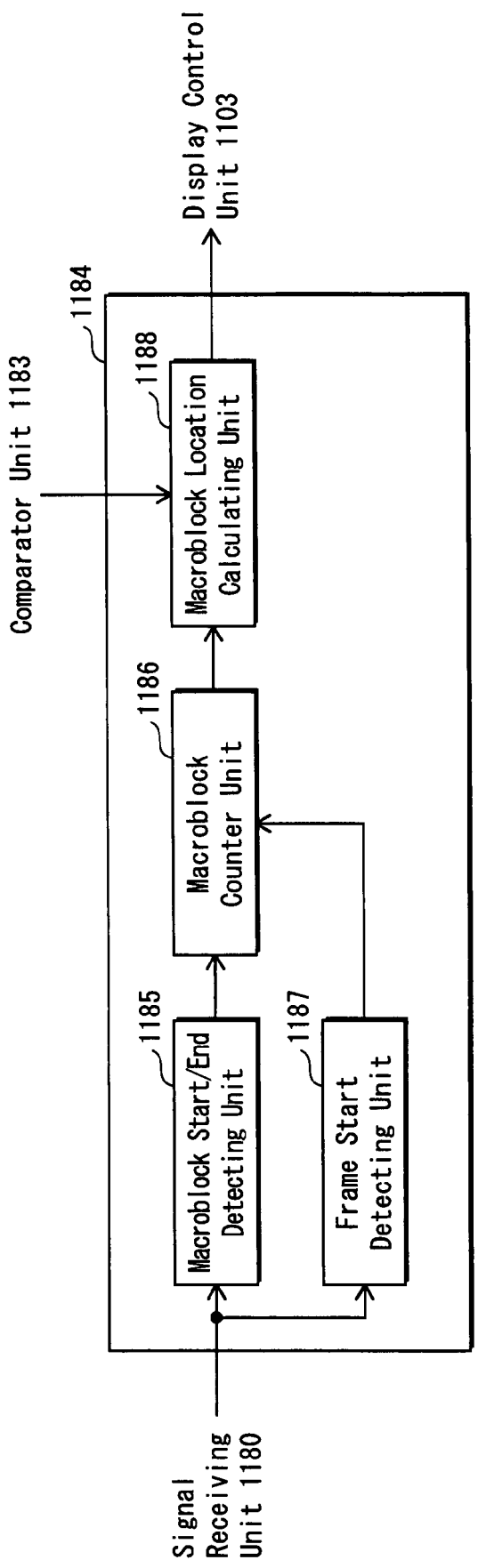
FIG. 11 is a block diagram illustrating the structure of a macroblock location detecting unit 1184.

As illustrated in FIG. 11, the macroblock location detecting unit 1184 is generally composed of a macroblock start/end detecting unit 1185, a macroblock counter unit 1186, a frame start detecting unit 1187, and a macroblock location calculating unit 1188.

(Macroblock Counter Unit 1186)

The macroblock counter unit 1186 is a counter for counting the number of macroblocks detected by the macroblock start/end detecting unit 1185.

The initial value of the macroblock counter unit 1186 is "0".

(Macroblock Start/End Detecting Unit 1185)

The macroblock start/end detecting unit 1185 detects a boundary between a macroblock and the subsequent macroblock.

On receiving a 16-bit signal from the signal receiving unit 1180, the macroblock start/end detecting unit 1185 judges whether or not the received signal represents "00BB" that indicates the beginning of a macroblock (herein after, such data is referred to as a piece of "start data").

On judging that the received signal is start data, the macroblock start/end detecting unit 1185 increments the value of the macroblock counter unit 1186 by "1" and goes into a standby mode for receiving the next signal.

On judging that the received input signal is not start data, on the other hand, the macroblock start/end detecting unit 1185 simply goes into a standby mode for receiving the next signal.

(Frame Start Detecting Unit 1187)

On receiving a 16-bit signal from the signal receiving unit 1180, the frame start detecting unit 1187 judges whether or not the received signal represents a start code of an image signal.

On judging that the received signal is a start code; the frame start detecting unit 1187 resets the value of the macroblock counter unit 1186 to the initial value and goes into a standby mode for receiving a next signal.

On judging that the received input signal is not a start code, on the other hand, the frame start detecting unit 1187 simply goes into a standby mode for receiving the next signal.

(Macroblock Location Calculating Unit 1188)

The macroblock location calculating unit 1188 stores the number of macroblocks constituting one frame (herein after, referred to as "configuration number") in advance.

On receiving fault detection information from the comparator unit 1183, the macroblock location calculating unit 1188 acquires, from the macroblock counter unit 1186, the counter value indicating the number of macroblocks having been counted.

The macroblock location calculating unit 1188 calculates the coordinates specifying a location of a fault-containing macroblock in a frame, based on the acquired counter value and the configuration number stored in advance.

The macroblock location calculating unit 1188 generates second fault notification information that indicates the thus calculated coordinates and also indicates that a fault is detected during the image decoding. The thus generated second fault notification information is output to the display control unit 1103.

In the following description, both the first and second fault notification information may be referred to simply as fault notification information in the case where it is not necessary to distinguish one form the other.

(3) Display Control Unit 1103

As illustrated in FIG. 9, the display control unit 1103 is generally composed of a feature extracting unit 1160, a display image correcting unit 1161, an auxiliary-light control unit 1162, an information storage unit 1163, and first and second selectors 1166 and 1167.

The information storage unit 1163 includes first and second are as 1164 and 1165.

The display image correcting unit 1161, the auxiliary-light control unit 1162, the information storage unit 1163, the first and second selectors 1166 and 1167 are identical to their corresponding component units according to the first embodiment, namely the display image correcting unit 161, the auxiliary-light control unit 162, the information storage unit 163, the first and second selectors 166 and 167. Thus, no further description is given here.

(3-1) Feature Extracting Unit 1160

The feature extracting unit 1160 acquires a display image from one of the are as currently connected to the first selector 1152 of the image decoding unit 1102.

The feature extracting unit 1160 judges whether the are a currently connected to the first selector 1166 stores one or more pieces of second fault notification information.

On judging that second fault notification information is stored, the feature extracting unit 1160 acquires each piece of second fault notification information from the are a currently connected to the first selector 1166.

The feature extracting unit 1160 then specifies a macroblock located at the coordinates indicated by each piece of second fault notification information, so that one or more macroblock each containing a fault is specified.

The feature extracting unit 1160 extracts a feature from a region of the display image other than the specified one or more macroblocks, i.e. from a region that is free from a fault, and outputs the thus extracted feature to the display image correcting unit 1161 and also to the auxiliary-light control unit 1162.

On the other hand, on judging that no second fault notification information is stored, the feature extracting unit 1160 judges whether or not any piece of first fault notification information is stored in the are a.

On judging that first fault notification information is stored, the feature extracting unit 1160 operates similarly to the first embodiment. That is to say, the feature extracting unit 1160 conducts no feature extraction processing on the currently processed display image and outputs non-extraction information to the display image correcting unit 1161 as well as to the auxiliary-light control unit 1162.

On the other hand, if it is judged that no first fault notification information is sorted, i.e., no fault has occurred in the display image, the feature extracting unit 1160 operates similarly to the first embodiment. That is to say, the feature extracting unit 1160 extracts a feature from the entire display image and outputs the extracted feature to the display image correcting unit 1161 as well as to the auxiliary-light control unit 1162.

(4) Frame Management Unit 1104

The frame management unit 1104 is identical to the frame management unit 104 according to the first embodiment. Thus, no further description is given here.

2.2 Operation of Image Control Device 1010

The following describes operation of the image control device 1010.

Note that the fault detection processing by the signal input unit 1101 is performed through the same processing steps as those illustrated in FIG. 6 according to the first embodiment. Thus, no further description is given here.

(1) Decoding Processing

Figure 12:
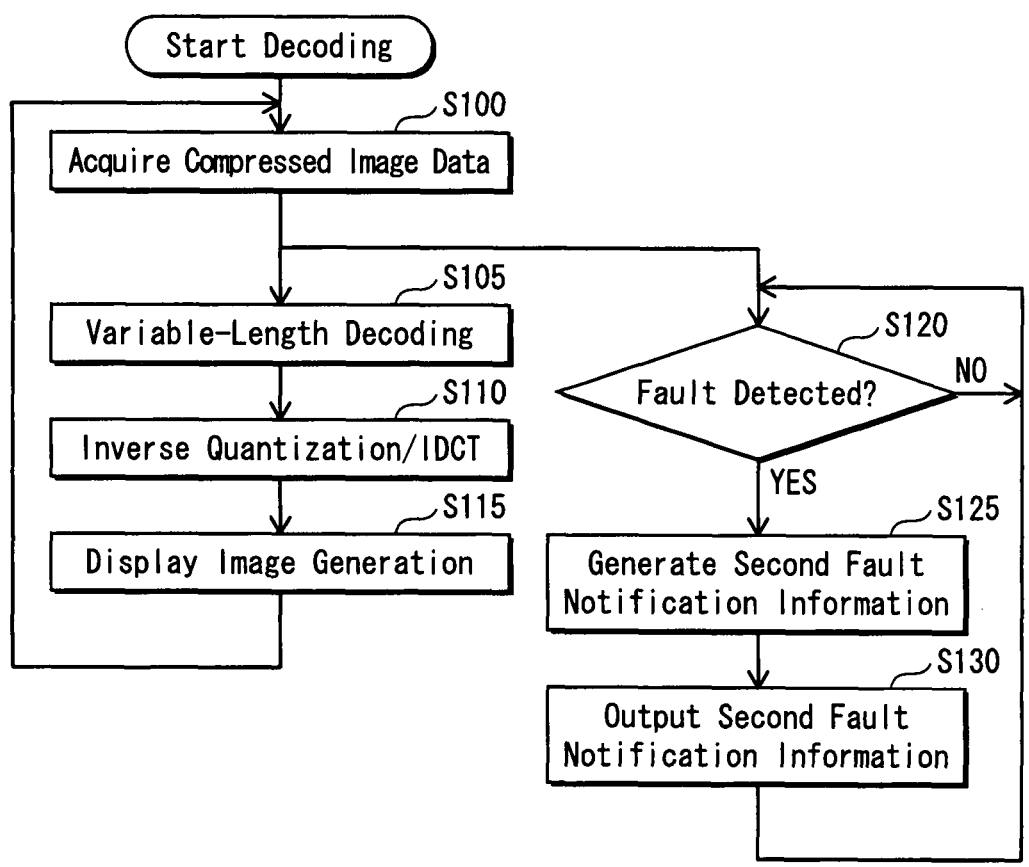
FIG. 12 is a flowchart of decoding processing performed by the entropy decoding unit 1140.

The following describes the decoding processing performed by the entropy decoding unit 1140, with reference to a flowchart illustrated in FIG. 12.

The entropy decoding unit 1140 acquires compressed image data (macroblock) to be processed, from the input signal processing unit 1110 (Step S100). The decode processing unit 1181 applies variable-length decoding to the acquired macroblock (Step S105). The inverse quantization/IDCT unit 1141 applies inverse quantization and inverse DCT to the data having been variable-length coded (Step S110). The adder unit 1142, the deblocking filter 1143, the reference image storage unit 1144, the motion compensation unit 1145, the weight prediction unit 1146, the intra-image prediction unit 1147, and the switch 1148 are employed to generate a display image from the data having been subjected to the inverse quantization and inverse DCT (Step S115). Details of the processing steps S105-S115 are known in the art and thus no further description is given here.

The entropy decoding unit 1140 judges whether or not the parity calculating unit 1182 and the comparator unit 1183 have detected a fault as a result of parity check (Step S120).

On judging that a fault has been detected (Step S120: YES), the comparator unit 1183 outputs fault detection information to the macroblock location detecting unit 1184. Upon receipt of the fault detection information from the comparator unit 1183, the macroblock location detecting unit 1184 calculates the coordinates of a macroblock in which the fault is detected, and generates second fault notification information indicating the thus calculated coordinates and also indicating that a fault has been detected during the decoding processing (Step S125). The macroblock location detecting unit 1184 then outputs the generated second fault notification information to the display control unit 1103 (Step S130).

On the other hand, if it is judged that no fault has been detected (Step S120: NO) or if second fault notification information is output to the display control unit 1103, the entropy decoding unit 1140 goes back to Step S120 to conduct the fault detection processing on a subsequent macroblock having been variable-length coded.

(2) Correction Processing

Figure 13:
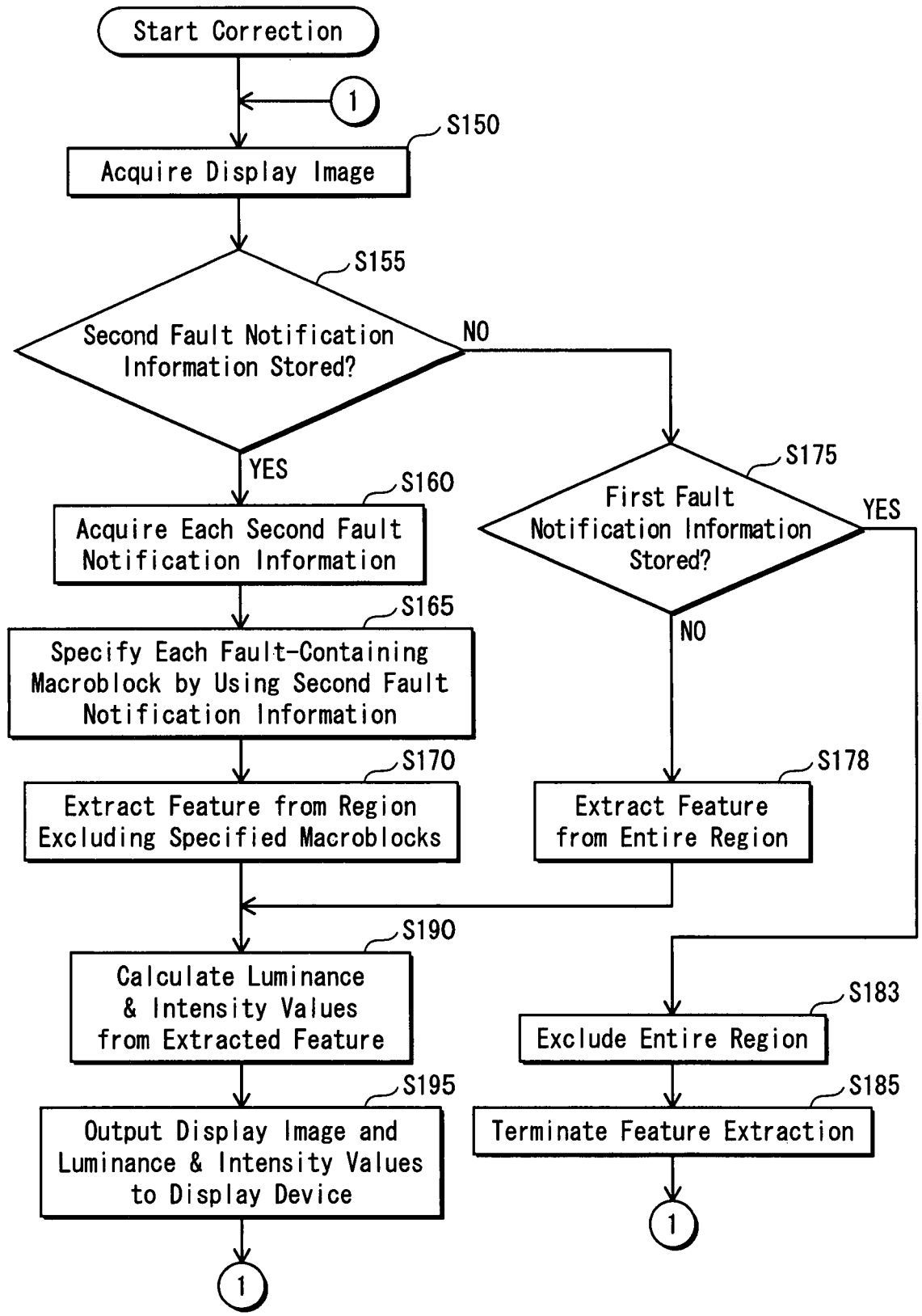
FIG. 13 is a flowchart of correction processing performed by a display control unit 1103.

The following describes the correction processing performed by the display control unit 1103, with reference to a flowchart illustrated in FIG. 13.

Each of the feature extracting unit 1160 and the display image correcting unit 1161 of the display control unit 1103 acquires a display image from one of the are as currently connected to the first selector 1152 of the image decoding unit 1102 (Step S150).

The feature extracting unit 1160 judges whether or not the are a currently connected to the first selector 1166 stores one or more pieces of second fault notification information (Step S155).

On judging that second fault notification information is stored (Step S155: YES), the feature extracting unit 1160 acquires each piece of second fault notification information from the are a currently connected to the first selector 1166 (Step 8160).

The feature extracting unit 1160 then specifies a macroblock located at the coordinates indicated by each piece of second fault notification information, so that one or more macroblocks each containing a fault are specified (Step S165).

The feature extracting unit 160 extracts a feature from a region of the display image other than the thus specified one or more macroblocks. That is to say, a feature is extracted from the region of the display image that is free from any fault. The feature extracting unit 160 then outputs the thus extracted feature to the display image correcting unit 1161 and also to the auxiliary-light control unit 1162 (Step S170).

From the received feature, the display image correcting unit 1161 calculates the luminance value at which the display image is to be displayed, where as the auxiliary-light control unit 1162 calculates the backlight intensity value to be emitted (Step S190). The display image correcting unit 1161 outputs the calculated luminance value and the display image to the display device 1020, where as the auxiliary-light control unit 1162 outputs the calculated intensity value to display device 1020 (Step S195).

On the other hand, if it is judged that no second fault notification information is stored (Step S155: NO), the feature extracting unit 1160 judges whether or not the are a currently connected to the first selector 1166 stores one or more pieces of first fault notification information (Step S175).

On judging that no first fault notification information is stored (Step S175: NO), the feature extracting unit 1160 extracts a feature from the entire region of the acquired display image and outputs the extracted feature to the display image correcting unit 161 and also to the auxiliary-light control unit 162 (Step S178). The feature extracting unit 1160 then performs Step S190 and the subsequent steps.

On the other hand, if it is judged that first fault notification information is stored (Step S175: YES), the feature extracting unit 1160 excludes the entire region of the display image acquired in Step S150 from the subject of the feature extraction processing (Step S183). The feature extracting unit 1160 terminates the feature extraction processing on the currently proceeds display image (Step S185) and goes back to Step S150. At this time, the display image correcting unit 1161 outputs first non-calculation information and the display image to the display device 1020. In addition, the auxiliary-light control unit 1162 outputs second non-calculation information to the display device 1020.

2.3 Modifications

The second embodiment of the present invention is described merely by way of example and without limitation. The present invention may be embodied in various other ways without departing from the gist of the present invention. Various modifications including the following still fall within the scope of the present invention.

(1) According to the above embodiment, the fault detecting processing is described to be conducted by both the fault detecting unit 1111 and the entropy decoding unit 1140. However, this description is merely by way of example and not of limitation.

The second embodiment may be so modified that the fault detection is conducted solely by the entropy decoding unit 1140.

According to this modification, the image control device 1010 detects a fault only on a macroblock-by-macroblock basis, and regions to be excluded from the feature extraction are determined in the units of macroblocks.

(2) According to the above embodiment, the feature extracting unit 1160 of the display control unit 1103 is described to specify a macroblock in which a fault has occurred, by using second fault notification information. The feature extracting unit 1160 then excludes the specified macroblock from subject of the feature extraction processing. However, the description is given merely by way of example and without limitation.

For example, a predetermined region that includes the specified macroblock may be excluded from the feature extraction processing.

The predetermined region may be one horizontal, vertical, or diagonal line of the display image that includes the specified macroblock. Alternatively, the predetermine region may be a combination of one or more of the above-mentioned lines, a portion of one of the above-mentioned lines, or a combination of portions of two or more of the above-mentioned lines.

(3) The above embodiment may be so modified that the auxiliary-light control unit 1162 calculates the backlight intensity value regarding the fault-free region of the display image only. That is, the auxiliary-light control unit 1162 does not conduct the intensity value calculation on any region that contains a fault.

Alternatively, the auxiliary-light control unit 1162 may be modified to output the intensity value of 0% (thus, the auxiliary light will be shut off) regarding the region not used for the feature extraction.

(4) According to the above embodiment, it is the macroblock location detecting unit 1184 that calculates the coordinates of a macroblock in which a fault has occurred. Yet, the present invention is not limited thereto.

The above embodiment may be so modified that the coordinates of a fault-containing macroblock may be calculated by the feature extracting unit 1160.

According to this modification, the macroblock location detecting unit 1184 outputs second fault notification information that indicates not the coordinates but the macroblock number (the value acquired from the macroblock counter unit 1186) to the display control unit 1103.

In addition, the feature extracting unit 1160 stores the configuration number in advance.

The feature extracting unit 1160 calculates the coordinates in the display image, by using the configuration number and the macroblock number. The macroblock number is indicated in second fault notification information that is acquired from the are a currently connected to the first selector 1166.

(5) According to the above embodiment, the entropy decoding unit 1140 is described to check whether or not a fault has occurred in each macroblock by parity check. Yet, the present invention is not limited thereto.

The entropy decoding unit 1140 may be modified to check whether compressed image data has been correctly extracted (decoded) at the time of data extraction (decoding).

If the compressed image data is not correctly decompressed, the entropy decoding unit 1140 judges that a fault has occurred and generates second fault notification information indicating the number identifying the macroblock being processed (i.e., the compressed image data not correctly decompressed). The entropy decoding unit 1140 outputs the thus generated second fault notification information to the display control unit 1103.

Alternatively, the entropy decoding unit 1140 may be modified to additionally conduct parsing of the compressed image data. If a syntax error is detected, the entropy decoding unit 1140 generates second fault notification information indicating the number identifying the macroblock being processed (i.e., the compressed image data containing the syntax error) and outputs the thus generated second fault notification information to the display control unit 1103.

(6) According to the above embodiment, it is the entropy decoding unit 140 that conducts the fault detection and the fault detection is conducted for each macroblock. Yet, the present invention is not limited thereto.

For example, the above embodiment may be so modified that the fault detecting unit 1111 conducts the fault detection on each display image (in the units of image signals), in addition to the fault detection on each macroblock.

Alternatively, the above embodiment may be so modified that the fault detecting unit 1111 conducts the fault detection only on the basis of macroblocks.

(7) The image control device 1010 according to above embodiment may so be modified that the fault detecting unit 1111 performs the parity check of each start and end codes and the entropy decoding unit 1140 conducts the parity check of each macroblock.

(8) The above embodiment may be so modified that the entropy decoding unit 140 operates as follows each time parity check is performed for a macroblock. Note that it is supposed that the compressed image data complies with an MPEG standard.

The reference image storage unit 1144 stores a reference image generated. If the reference image contains a fault, the reference image storing unit 1144 additionally stores specification information associated with the reference image. The specification information specifies a location of where in the reference image the error has occurred (for example, the coordinates of a macroblock).

The entropy decoding unit 1140 judges the type of display image from the macroblock to be decoded If the display image is judged to be either a B-picture or a P-picture, the entropy decoding unit 1140 specifies a region of the reference image to be used as reference, and judges whether or not the thus specified reference region coincides with the coordinates indicated by the specification information.

If it is judged that the location of reference region coincides with the coordinates, the entropy decoding unit 1140 generates second fault notification information indicating the reference region and outputs the thus generated second fault notification information to the display control unit 1103.

On the other hand, if it is judged that the location of reference region does not coincide with the coordinates or if no specification information is stored in the reference image storage unit 1144, the entropy decoding unit 140 moved onto the next processing step.

If the display image is judged to be an I-picture, the entropy decoding unit 140 simply conducts the fault detection on the received macroblock.

(9) The present invention may be embodied by any combination of the above embodiment with any of the modifications described above.

2.4 Recapitulation of Second Embodiment

According to the first embodiment, the image control device 10 notifies violation (i.e., output of fault notification information) in the units of display images. Thus, even if a fault occurs only in a small region of one display image, it is equal in effect that the fault relates to the entire display image. Thus, it is not possible to conduct different display controls on different regions of one display image.

However, the second embodiment is directed to image decoding processing according to H.264/MPEG-4 AVC according to which one display image is decoded by sequentially processing regions of the display image each having a predetermined pixel size. The entropy decoding unit 1140 sequentially receives portions (macroblocks) of the compressed image data and detects a fault upon decoding a specific portion of the compressed image data. This allows the image control device 1010 to recognize that a fault is detected in a specific macroblock, so that the image control is conducted in a more detailed manner The following describes the regions of a display image subjected to the feature extraction according to the first and second embodiments, with reference to FIGS. 14 and 15. In FIGS. 14 and 15, each diagonally shaded are a represents a region excluded from the feature extraction.

Figure 14A:
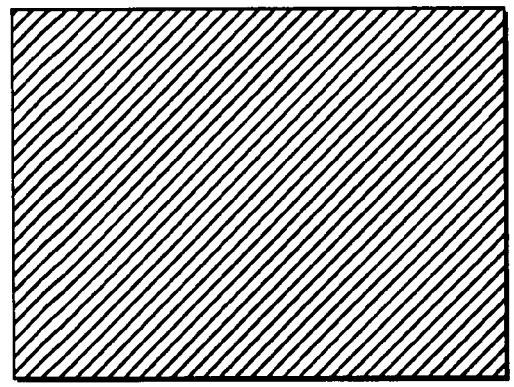
FIG. 14 is illustrate regions of a display image used for feature extraction.
Figure 15:
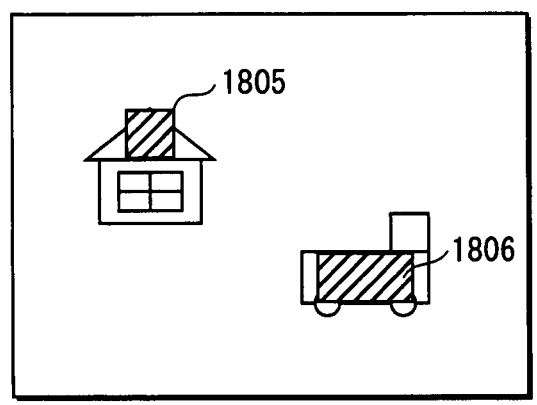
FIG. 15 illustrate an example of regions in each of which a fault has occurred.

FIG. 14A illustrates an example in which a region of a display image is excluded according to the first embodiment. When the image control device 10 detects a fault from an input signal, the region represented by the shaded are a is excluded from the feature extraction of the display image corresponding in part to the input signal in which the fault is detected.

Figure 14B:
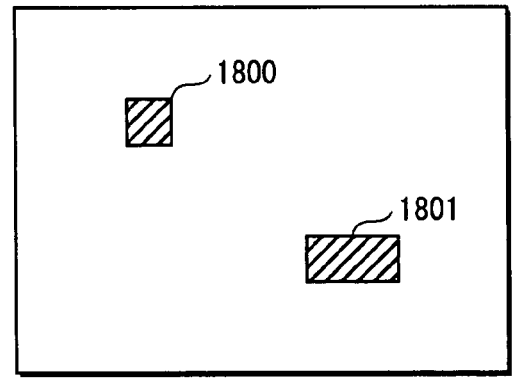

FIG. 14B illustrates an example in which regions of a display image are excluded according to the second embodiment. If a fault is detected during the decoding of a macroblock, that macroblock is excluded from the feature extraction. In the example illustrated in FIG. 14B, two regions 1800 and 1801 are excluded from the feature extraction. Note that the region 1800 is composed of one macroblock, where as the region 1801 is composed of two adjacent macroblocks.

Figure 14C:
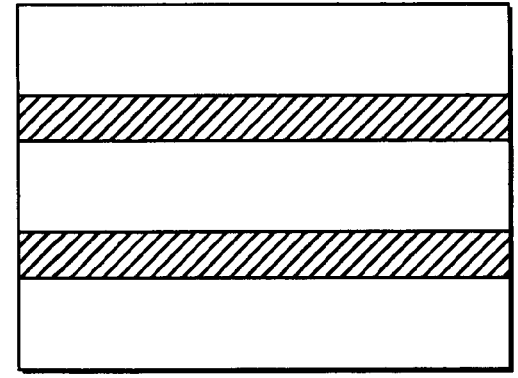

FIG. 14C illustrates an example in which regions of a display image is excluded according to a modification of the second embodiment. If a fault is detected during the decoding of a macroblock, an entire line containing that macroblock is excluded from the feature extraction.

Figure 14D:
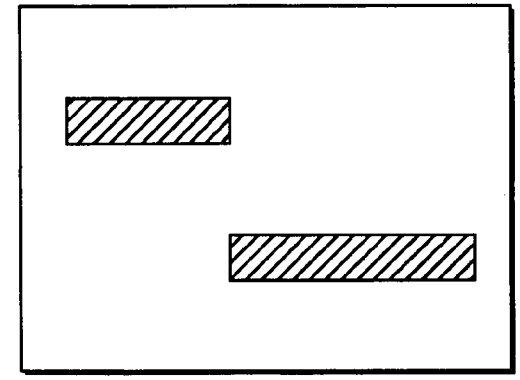

FIG. 14D illustrates an example in which regions of a display image is excluded according to a modification of the second embodiment. If a fault is detected during the decoding a macroblock, a predetermined region containing that macroblock is excluded from the feature extraction.

In the example of FIG. 14B, the image control device 10 can specify the regions 1800 and 1801 in each of which a fault has occurred. This enables more detailed image control to be conducted as compared with the first embodiment.

In a more specific example, the image control device 1010 can specify regions 1805 and 1806 of a display image illustrated in FIG. 15 with reference to second fault notification information. The regions 1805 and 1806 correspond to the regions 1800 and 1801 illustrated in FIG. 14B, respectively.

As described above, in addition, the image control device 1010 may control image display based on regions of a display image each relating to a violation. Each of such a region may be a vertical or diagonal line containing a macroblock containing the violation. Alternatively, each of such regions may be a set of macroblocks that includes a macroblock containing the violation and adjacent macroblocks.

Figure 16:
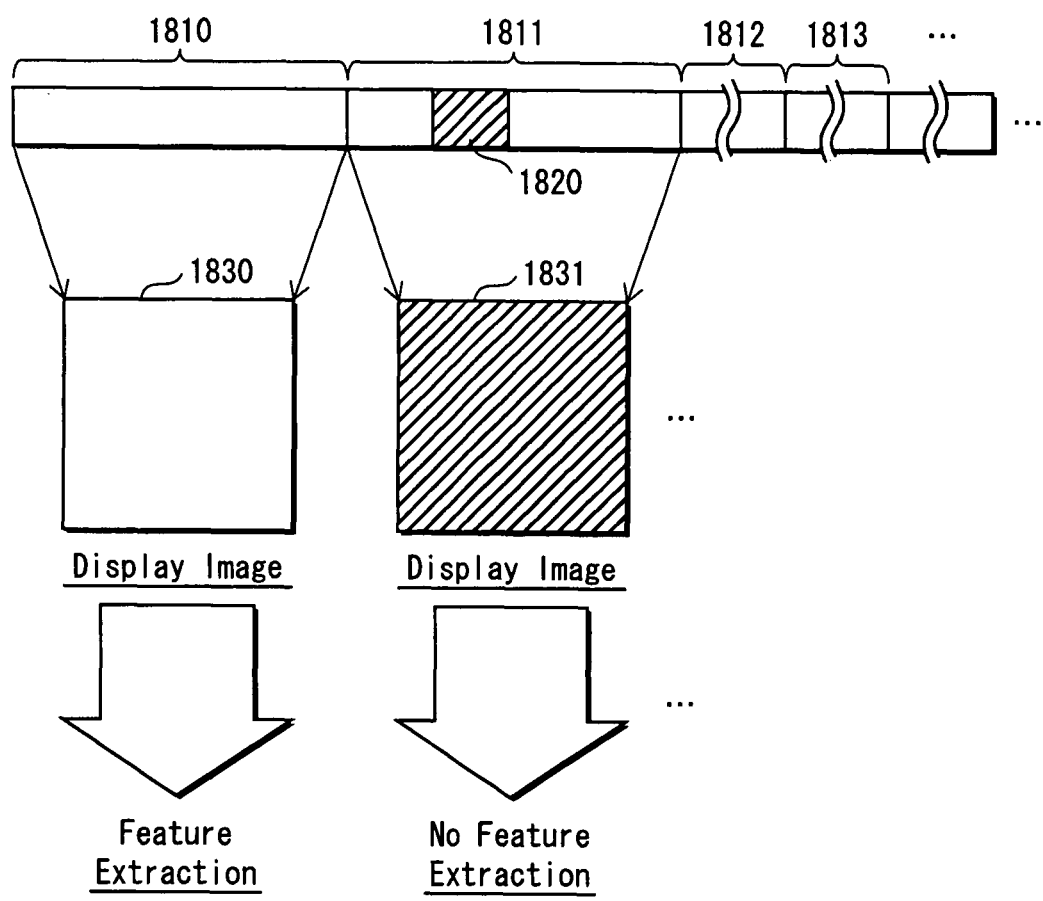
FIG. 16 illustrates the relation between the fault detection conducted on a frame-by-frame basis and a display image.
Figure 17:
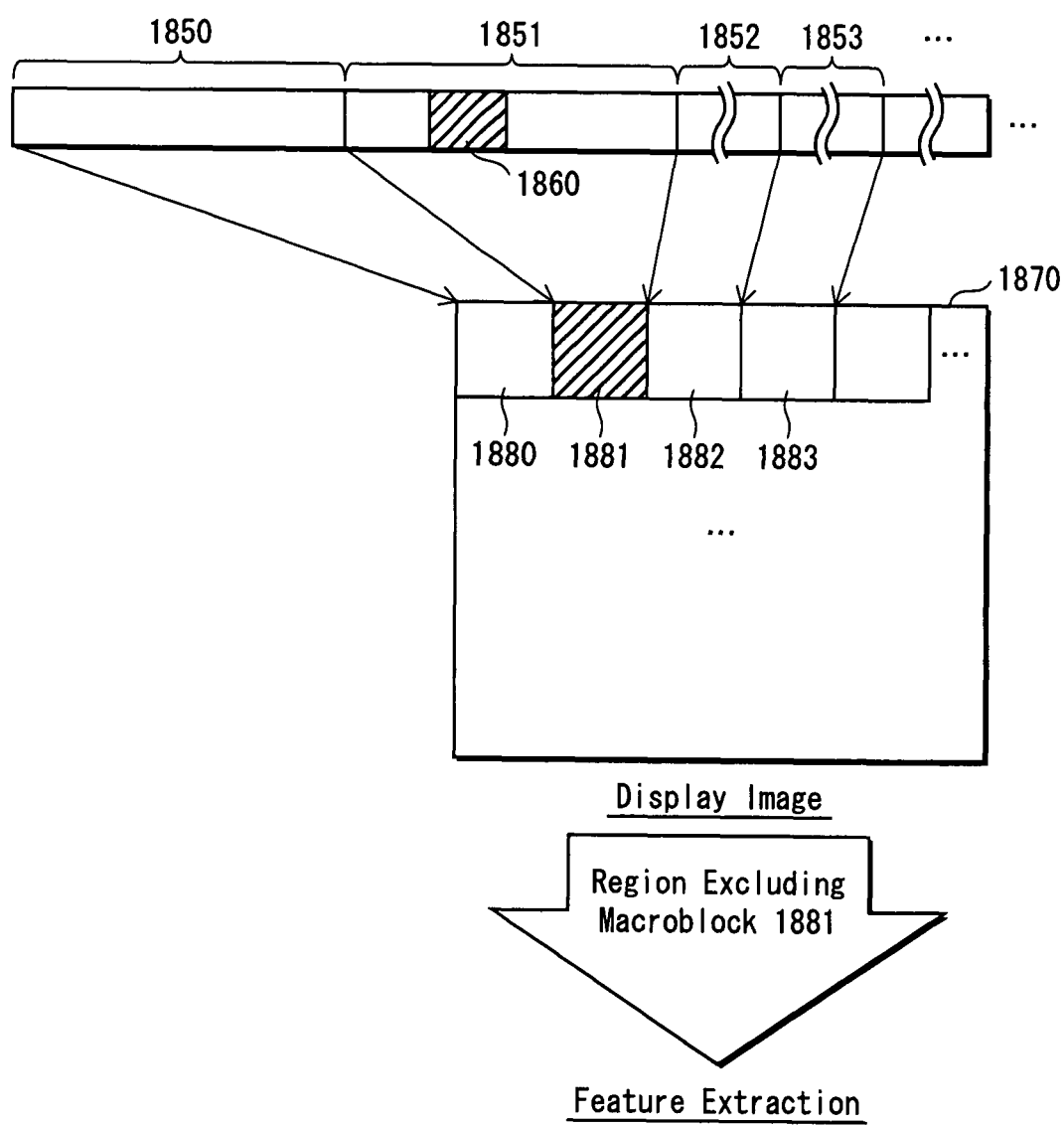
FIG. 17 illustrates the relation between the fault detection conducted on a macroblock-by-macroblock basis and a display image.

With reference FIGS. 16 and 17, the following additionally describes the relation between a display image and the fault (violation) detection. FIG. 16 illustrates an example in which the fault detection is conducted on a frame-by-frame basis. FIG. 17 illustrates an example in which the fault detection is conducted on a macroblock-by-macroblock basis.

The following describes the fault detection conducted on a frame-by-frame basis.

As illustrated in FIG. 16, the image control device 1010 receives image signals 1810, 1811, 1812, 1813 . . . each carrying image data worth one frame.

The image control device 1010 checks with the fault detecting unit 1111 whether or not each image signal contains a fault. In this way, the image control device 1010 detects a fault occurred in a display image, which equally means one frame.

In the example illustrated in FIG. 16, the image control device 1010 detects no fault in any of the input signals included in an image signal 1810. Thus, the image control device 1010 extracts a feature from the entire region of a display image 1830 that is generated from the image signal 1810 by the image decoding unit 1102.

Then, the image control device 1010 detects a fault from an input signal included in an image signal 1811. Thus, the image control device 10 excludes the entire region of a display image 1831 from the feature extraction and terminates the feature extraction from the display image 1831.

Now, the following describes the fault detection conducted on a macroblock-by-macroblock basis.

As illustrated in FIG. 17, the image decoding unit 1102 receives image signals 1850, 1851, 1852, 1853 . . . from the signal input unit 1101.

The image decoding unit 1102 checks with the entropy decoding unit 1140 whether a fault has occurred during the variable-length decoding. Thus, if a fault occurs, the image decoding unit 1102 detects that a fault has occurred in the currently processed macroblock.

As illustrated in FIG. 17, the image decoding unit 1102 generates a display image 1870. The display image 1870 is composed of macroblocks 1880, 1881, 1882, 1883 . . . generated by decoding compressed image data pieces 1850, 1851, 1852, 1853 . . . . Suppose that the entropy decoding unit 1140 detects a fault in the compressed image data 1851. In this case, the image control device 1010 extracts a feature from the regions of the display image 1870 other than the macroblock 1881 in which the fault has detected.

As described above, the image decoding unit 1102 sequentially decodes macroblocks of one display image. Thus, if a fault (violation) is detected, the image control device is enabled to specify in which of the macroblocks the fault occurred.

3. Third Embodiment

The following describes an image display system 3 according to a third embodiment of the present invention, focusing on differences with the second embodiment.

Figure 18:
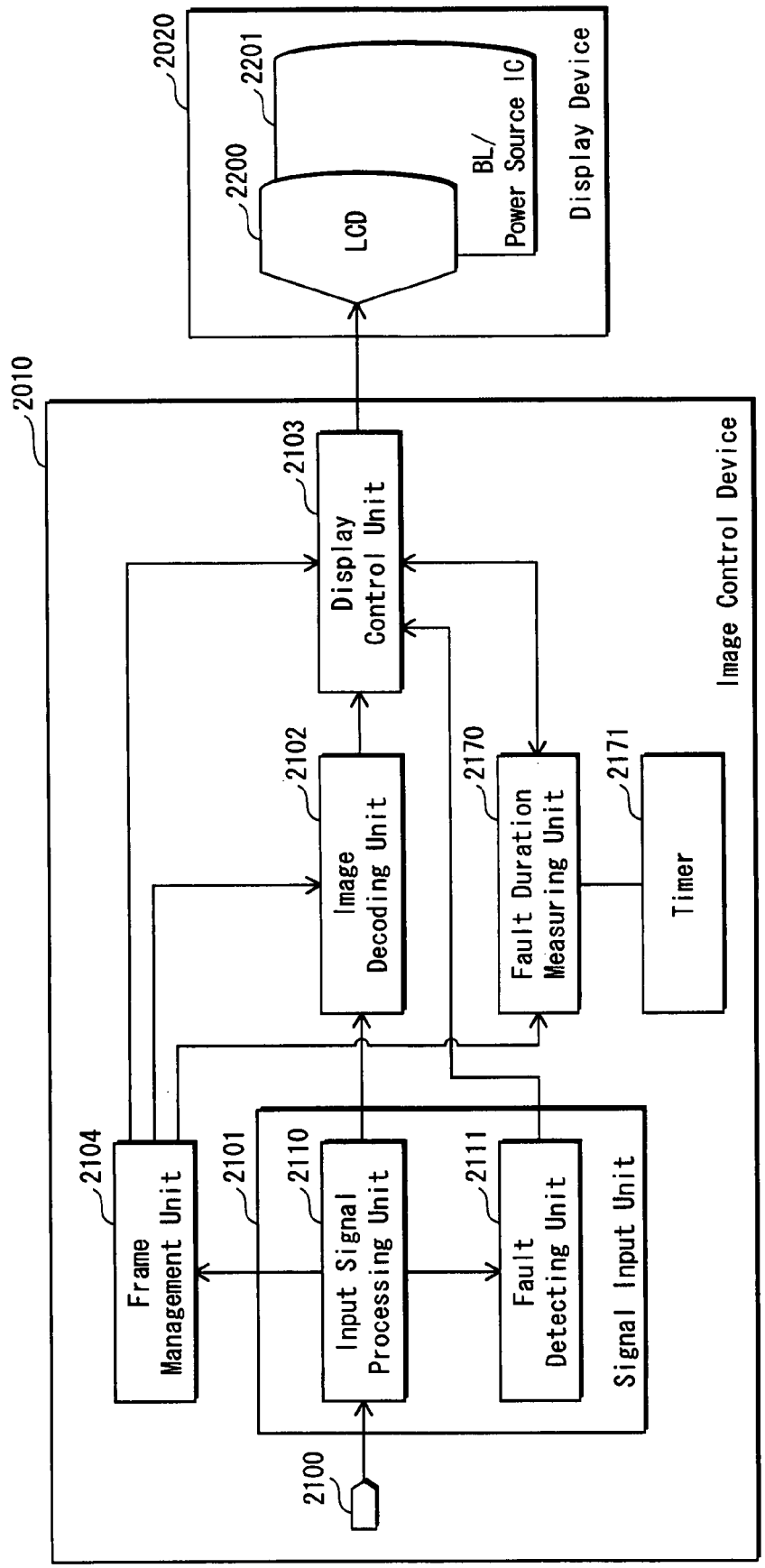
FIG. 18 is a block diagram diagrammatically illustrating an image display system 3.

As illustrated in FIG. 18, the image display system 3 is generally composed of an image control device 2010 and a display device 2020.

The image control device 2010 differs from the image control device 1010 with respect to the following. The image control device 2010 starts measuring time upon detection of a fault in a display image and ends the time measurement upon reception of a normal display image (a display image in which no fault is detected). The image control device 2010 conducts display image control in accordance with the measurement result.

Figure 19:
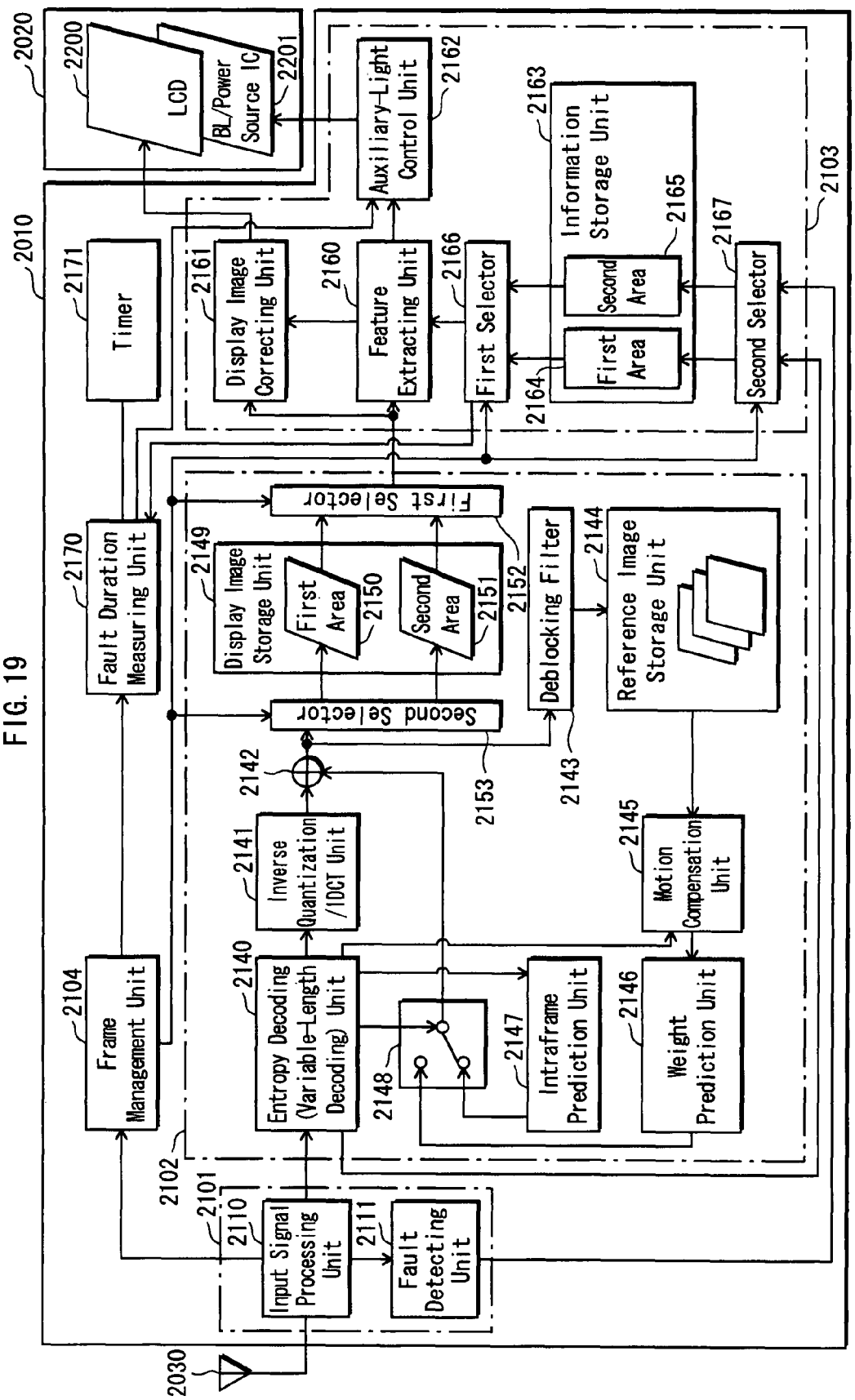
FIG. 19 is a block diagram illustrating the structure of an image control device 2010 and a display device 2020.

As illustrated in FIGS. 18 and 19, the display device 2020 is generally composed of an LCD 2200 and a BL/power source IC 2201. The LCD 2200 and the BL/power source IC 2201 are respectively identical to the LCD 1200 and the BL/power source IC 1201 described in the second embodiment. Thus, no further description is given here.

The following describes the structure of the image control device 2010.

3.1 Structure of Image Control Device 2010

The following describes the structure of the image control device 2010.

As illustrated in FIG. 18, the image control device 2010 is generally composed of an input terminal 2100, a signal input unit 2101, an image decoding unit 2102, an image control unit 2103, a frame management unit 2104, a fault duration measuring unit 2170, and a timer 2171.

(1) Signal Input Unit 2101

As illustrated in FIGS. 18 and 19, the signal input unit 2101 is generally composed of an input signal processing unit 2110 and a fault detecting unit 2111. The signal input unit 2101 processes image signals received from an antenna 2030.

Each of the input signal processing unit 2110 and the fault detecting unit 2111 is generally composed of component units identical to those of the input signal processing unit 1110 and the fault detecting unit 1111 according to the second embodiment and operates in the same manner. Thus, no further description is given here.

(2) Image Decoding Unit 2102

The image decoding unit 2102 decodes image data (macroblocks) having been compression coded according to the H.264/MPEG-4 AVC standard, to generate display images.

As illustrated in FIG. 18, the image decoding unit 2102 is generally composed of an entropy decoding (variable-length decoding) unit 2140, an inverse quantization/IDCT unit 2141, an adder unit 2142, a deblocking filter 2143, a reference image storage unit 2144, a motion picture compensation unit 2145, a weight prediction unit 2146, an intra-image prediction unit 2147, a switch 2148, a reference image storage unit 2149, and first and second selectors 2152 and 2153.

Each of the entropy decoding unit 2140, the an inverse quantization/IDCT unit 2141, the adder unit 2142, the deblocking filter 2143, the reference image storage unit 2144, the motion picture compensation unit 2145, the weight prediction unit 2146, the intra-image prediction unit 2147, the switch 2148, the reference image storage unit 2149, and the first and second selectors 2152 and 2153 are identical to the corresponding component units described in the second embodiment, namely, the entropy decoding unit 1140, the inverse quantization/IDCT unit 1141, the adder unit 1142, the deblocking filter 1143, the reference image storage unit 1144, the motion compensation unit 1145, the weight prediction unit 1146, the intra-image prediction unit 1147, the switch 1148, the display image storage unit 1149, the first and second selectors 1152 and 1153. Thus, no description of such component units is given here.

(3) Timer 2171

The timer 2171 measures time. The initial value of the timer 2171 is "0". Under control by the fault duration measuring unit 2170, the timer 2171 starts and stops time measurement and is reset to the initial value.

(4) Fault Duration Measuring Unit 2170

The fault duration measuring unit 2170 has a time measurement flag indicating-whether or not the timer 2171 is conducing time measurement. In this embodiment, the time measurement flag set to "0" indicates that time measurement is not conducted, where as the time measurement flag set to "1" indicates that time measurement is currently being conducted. Note that the time measurement flag is initially set "0".

When switching-completion information indicating that a switching instruction has been output is received from the frame management unit 2104, the fault duration measuring unit 2170 judges whether or not the are a currently connected to the first selector 2166 of the image control unit 2103 stores fault notification information.

(If Fault Notification Information is Stored)

On judging that fault notification information is stored, the fault duration measuring unit 2170 judges whether the time measurement flag is set to "0" or "1".

On judging that the time measurement flag is set to "0", the fault duration measuring unit 2170 alters the value of the time measurement flag to "1" and causes the timer 2171 to start measuring time. The fault duration measuring unit 2170 then goes into a standby mode for receiving the next piece of switching-completion information and starts monitoring the time measurement being conducted by the timer 2171.

On the other hand, on judging that the time measurement flag is set to "1", the fault duration measuring unit 2170 simply-goes into a standby mode for receiving the next piece of switching-completion information.

Note that the monitoring operation of time measurement will be described later in detail.

(If Fault Notification Information is not Stored)

On judging that fault notification information is not stored, the fault duration measuring unit 2170 judges whether or not the time measurement flag is set to "0" or "1". On judging that the time measurement flag is set to "1", the fault duration measuring unit 2170 alters the value of the time measurement flag to "0", causes the timer 2171 to stop the time measurement, and resets the timer 2171. In addition, the fault duration measuring unit 2170 terminates the monitoring of time measurement and judges whether or not a shutoff instruction to shut off the backlight has been output to the image control unit 2103. On judging that a shutoff instruction has been output, the fault duration measuring unit 2170 outputs to the image control unit 2103 a shutoff-cancellation instruction to turn on the backlight.

On judging that a shutoff instruction has not output issued, the fault duration measuring unit 2170 simply goes into a standby mode for receiving the next piece of switching-completion information.

On judging that the time measurement flag is set to "0", the fault duration measuring unit 2170 goes into a standby mode for receiving the next piece of switching-completion information.

Note that the judgment as to whether or not a shutoff instruction has been output is made by using, for example, an issuance flag indicating whether or not a shutoff instruction has been output. For example, the issuance flag set to "0" indicates that a shutoff instruction has not been output, whereas the issuance flag set to "1" indicates that a shutoff instruction has been output. Note that the issuance flag is initially set to "0". On/outputting a shutoff instruction, the fault duration measuring unit 2170 alters the value of the issuance flag from "0" to "1". In addition, the fault duration measuring unit 2170 resets the issuance flag to "0" when terminating the time measurement monitoring.

(Monitoring of Time Measurement)

When the value of the time measurement flag is altered from "0" to "1", the fault duration measuring unit 2170 starts monitoring the time measurement conducted by the timer 2171.

The fault duration measuring unit 2170 judges whether or not the elapsed time has exceeded a predetermined time period (5 seconds, for example). On judging that the predetermined time period has been exceeded, the fault duration measuring unit 2170 outputs a shutoff instruction to the image control unit 2103 and keeps monitoring the time measurement. On judging that the predetermined time period has not been exceeded, the fault duration measuring unit 2170 simply keeps monitoring the time measurement.

The fault duration measuring unit 2170 terminates the monitoring when the value of the time measurement flag is altered from "1" to "0".

The fault duration measuring unit 2170 may repeatedly output a shutoff instruction to the image control unit 2103, until terminating the monitoring. Alternatively, the fault duration measuring unit 2170 may output a shutoff instruction only once.

(5) Image Control Unit 2103

As illustrated in FIG. 18, the image control unit 2103 is generally composed of a feature extracting unit 2160, a display image correcting unit 2161, an auxiliary-light control unit 2162, an information storage unit 2163, a first selector 2166, and a second selector 2167.

The information storage unit 2163 has first and second areas 2164 and 2165.

Each of the feature extracting unit 2160, the display image correcting unit 1161, the information storage unit 2163, and the first and second selectors 2166 and 2167 are identical to corresponding component units described in the second embodiment, namely, the feature extracting unit 1160, the display image correcting unit 1161, the information storage unit 1163, and the first and second selectors 1166 and 1167. Thus, no further description is given here.

(5-1) Auxiliary-Light Control Unit 2162

The auxiliary-light control unit 2162 receives a feature of a display image from the feature extracting unit 2160 and calculates the luminance value from the received feature and outputs the thus calculated luminance value to the display device 2020.

Once a shutoff instruction is received from the fault duration measuring unit 2170, the auxiliary-light control unit 2162 does not conduct any further calculation of a backlight intensity value until a shutoff-cancellation instruction is received from the fault duration measuring unit 2170. Instead, the auxiliary-light control unit 2162 controls the display device 2020 so that the backlight stays unilluminated for the time being. For example, the auxiliary-light control unit 2162 may output, to the display device 2020, such an intensity value that indicates illumination at 0% of the full intensity, until receiving a shutoff-cancellation instruction from the fault duration measuring unit 2170.

On receiving a shutoff-cancellation instruction from the fault duration measuring unit 2170, the auxiliary-light control unit 2162 resumes the calculation of a backlight intensity value from a received feature of a display image.

On receiving non-extraction information from the feature extracting unit 2160, the auxiliary-light control unit 2162 generates second non-calculation information and outputs the thus generated second non-calculation information to the display device 2020.

(6) Frame Management Unit 2104

On receiving transition detection information from the input signal processing unit 2110, the frame management unit 2104 outputs a switching instruction to the first and second selectors 2152 and 2153 of the image decoding unit 2102 as well as to the first and second selectors 2166 and 2167 of the image control unit 2103.

After outputting a switching instruction to the respective selectors, the frame management unit 2104 outputs switching-completion information to the fault duration measuring unit 2170.

With the above configuration, the are as for storing a display image are alternated on a frame-by-frame basis. In addition, are as for storing fault notification information are alternated on a frame-by-frame basis. Thus, the fault duration measuring unit 2170 is enabled to make a judge whether or not a fault has occurred on a frame-by-frame basis.

3.2 Operation of Image Control Device 2010

The following describes operation of the image control device 2010.

Note that the fault detection processing by the signal input unit 2101 is performed through the same processing steps illustrated in FIG. 6 according to the first embodiment. In addition, the decoding processing by the image decoding unit 2102 as well as the correction processing by the image control unit 2103 are each performed through the same processing steps illustrated in FIGS. 12 and 13 according to the second embodiment. Thus, no further description is given here.

(1) Measurement Processing

Figure 20:
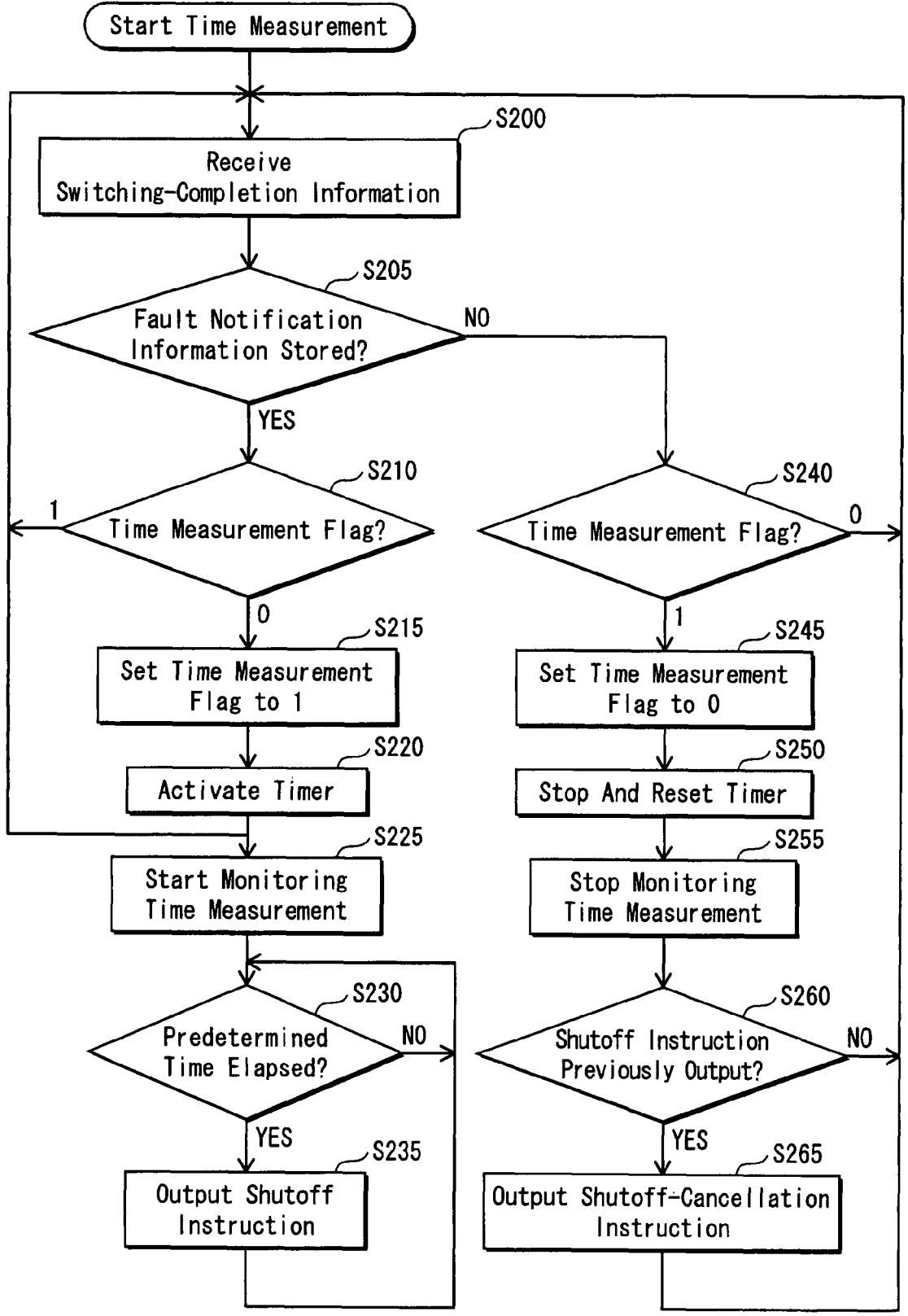
FIG. 20 is a flowchart of measurement processing performed by a fault duration measuring unit 2170.

The following describes the measurement processing performed by the fault duration measuring unit 2170, with reference to a flowchart illustrated in FIG. 20.

On receiving switching-completion information from the frame management unit 2104 (Step S200), the fault duration measuring unit 2170 judges whether or not the are a currently connected to the first selector 2166 of the image control unit 2103 stores fault notification information (Step S205)

On judging that fault notification information is stored (Step S205: YES), the fault duration measuring unit 2170 then judges whether the time measurement flag is set to "0" or "1" (Step S210).

On judging that the time measurement flag is set to "0" (Step S210: "0"), the fault duration measuring unit 2170 sets the time measurement flag to "1" (Step S215), activates the timer 2171 to start measuring time (Step S220). The fault duration measuring unit 2170 then goes back to Step S200 and starts monitoring the time measurement being conducted by the timer 2171 (Step S225).

The fault duration measuring unit 2170 judges whether or not the elapsed time measured has exceeded the predetermined time period (5 seconds, for example) (Step S230). On judging that the predetermined time period has been exceeded (Step S230: YES), the fault duration measuring unit 2170 outputs a shutoff instruction to the image control unit 2103 (Step S235) and goes back to Step S230. On the other hand, if it is judged that the predetermined time period has not been exceeded yet (Step S230: NO), the fault duration measuring unit 2170 simply goes back to Step S230. Once outputting a shutoff instruction, the fault duration measuring unit 2170 may repeatedly output the shutoff instruction to the image control unit 2103 until terminating the monitoring. Alternatively, the fault duration measuring unit 2170 may output a shutoff instruction only once.

On judging that the time measurement flag is set to "1" Step S210: "1"), the fault duration measuring unit 2170 goes back to Step S200.

On judging that fault notification information is not stored (Step S205: NO), the fault duration measuring unit 2170 judges whether the time measurement flag is set to "0" or "1" (Step S240). On judging that the time measurement flag is set to "1" (Step S240: "1"), the fault duration measuring unit 2170 sets the time measurement flag to "0" (Step S245), causing the timer 2171 to stop the time measurement, and resets the timer 2171 (Step S250).

The fault duration measuring unit 2170 then terminates monitoring the time measurement (Step S255) and judges whether or not a shutoff instruction causing the backlight to be turned off has been output to the image control unit 2103 (Step S260).

On judging that a shutoff instruction has been output (Step S260: YES), the fault duration measuring unit 2170 outputs a shutoff-cancellation instruction causing the backlight to be turned on to the image control unit 2103 (Step S265). On the other hand, on judging that a shutoff instruction has not been output (Step S260: NO), the fault duration measuring unit 2170 goes back to Step S200.

On judging that the time measurement flag is set to "0" (Step S240: NO), the fault duration measuring unit 2170 goes back to Step S200.

3.3 Modifications

The third embodiment of the present invention is described merely by way of example and without limitation. The present invention may be embodied in various other ways without departing from the gist of the present invention. Various modifications including the following still fall within the scope of the present invention.

(1) According to the above embodiment, the image control device 2010 is described to turn off the backlight after the predetermined time period has elapsed. However, the description is given merely by way of example and without limitation.

The image control device 2010 may be modified to further reduce the intensity value of the auxiliary light calculated by the auxiliary-light control unit 2162 (for example by 50% of the calculated intensity value).

In this case, when the predetermined time period has elapsed from the start of the time measurement monitoring, the fault duration measuring unit 2170 outputs an intensity-reduction instruction to reduce the calculated intensity value, to the auxiliary-light control unit 2162.

In addition, when terminating the time measurement monitoring, the fault duration measuring unit 2170 judges whether or not an intensity-reduction instruction has been output to the image control unit 2103. On judging that an intensity-reduction instruction has been output, the fault duration measuring unit 2170 outputs a shutoff-cancellation instruction to he image control unit 2103. On the other hand, on judging that an intensity-reduction instruction has not been output, the fault duration measuring unit 2170 goes into a standby mode for receiving the next piece of switching-completion information.

Once an intensity-reduction instruction is received from the fault duration measuring unit 2170, the auxiliary-light control unit 2162 operates as follows until a shutoff-cancellation instruction is received from the fault duration measuring unit 2170. That is, the auxiliary-light control unit 2162 multiplies each intensity value calculated from a received feature by 0.5 and outputs the multiplication result to the display device 2020.

(2) According to the above embodiment, the image control device 2010 is described to measure the time duration for which faults continually occur. However, the description is given merely by way of example and without limitation.

The image control device 2010 may be modified to count the number of successive frames (display images) in each of which a fault has occurred.

According to the above modification, the image control device 2010 includes a measurement unit instead of the fault duration measuring unit 2170 and the timer 2171.

The following describes the measurement unit.

The measurement unit has a counter for courting the number of frames. The initial value of the counter is "0".

On receiving a switching-completion information from the frame management unit 2104, the measurement unit judges whether or not the are a currently connected to the first selector 2166 of the image control unit 2103 stores fault notification information.

On judging that fault notification information is stored, the measurement unit increments the counter value by "1" and judges whether or not the incremented counter value has exceeded a predetermined count (100, for example).

On judging that the predetermined count has been exceeded, the measurement unit outputs a shutoff instruction to the image control unit 2103. On the other hand, on judging that the predetermined count has not been exceeded yet, the measurement unit goes into a standby mode for receiving the next piece of switching-completion information.

On judging that fault notification information is not stored, the measurement unit resets the counter to "0" and judges whether or not a shutoff instruction has been output to the image control unit 2103. On judging that a shutoff instruction has been output, the measurement unit outputs a shutoff-cancellation instruction to the image control unit 2103. On the other hand, on judging that a shutoff instruction has not been output, the measurement unit goes into a standby mode for receiving the next piece of switching-completion information.

(3) According to the above embodiment, the fault duration measuring unit 2170 is described to rest the timer at the time of terminating the monitoring. However, this description is without limitation.

The fault duration measuring unit 2170 may be modified to subtract a predetermined number (2 seconds, for example) from the timer value at the time of terminating the monitoring. Thus, when the time measurement monitoring is resumed, the timer 2171 starts the time measurement from the currently held timer value.

Alternatively, the fault duration measuring unit 2170 may be modified to weigh a value according to the occurrences of faults and subtract the weighted value from the timer value at the time of terminating the monitoring. Thus, when the time measurement monitoring is resumed, the timer 2171 starts the time measurement from the currently held timer value.

According to the above modification, the fault duration measuring unit 2170 may reset the timer value if the number of pieces of fault notification information stored is equal to 3 or less, subtract "4" from the timer value if the number of pieces of fault notification value falls within the range of 4-10, and subtract "1" from the timer value if the number of pieces of fault notification value is equal to 11 or greater.

(4) According to the above embodiment, the initial value of the timer 2171 is described as "0". However, the value is given merely by way of example and without limitation.

The timer 2171 may initially set to a predetermined number (5, for example) and count down to measure time.

According to this modification, the fault duration measuring unit 2170 outputs a shutoff instruction to the image control unit 2103 when the timer value reaches "0". After the preset time runs out, the fault duration measuring unit 2170 may terminate or continue the time measurement monitoring. In the case of continuing the time measurement monitoring, the fault duration measuring unit 2170 may repeatedly output a shutoff instruction or may output a shutoff instruction only once.

(5) The present invention may be embodied by any combination of the above embodiment with any of the modifications described above.

3.4 Recapitulation of Third Embodiment

According to the third embodiment, if faults are continually detected for a predetermined time period or longer, the image control device 2010 turns off the auxiliary light or reduces the intensity value calculated from an extracted feature (so that the amount of auxiliary light is reduced). Thus, the display device 2020 achieves power savings.

4. Fourth Embodiment

The following describes an image display system 4 according to a fourth embodiment of the present invention, focusing on differences with the third embodiment.

4.1 Structure of Image Display System 4

Figure 21:
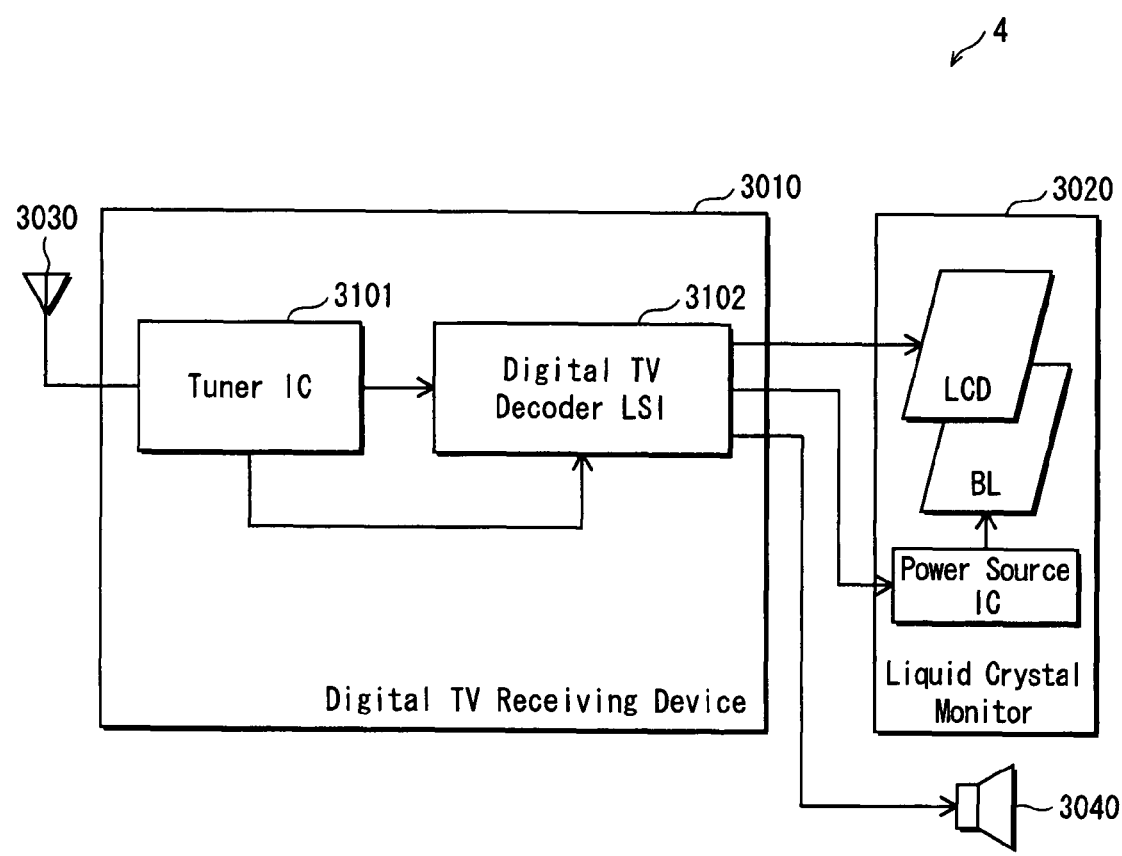
FIG. 21 is a block diagram diagrammatically illustrating an image display system 4.

As illustrated in FIG. 21, the image display system 4 is generally composed of a digital TV receiving device 3010, a liquid crystal monitor 3020, an antenna 3030, and a speaker 3040.

The antenna 3030 receives a digital television broadcasting wave and outputs the received wave as an image signal to the digital TV receiving device 3010. In this embodiment, the image signal includes audio signal components.

The digital TV receiving device 3010 includes a tuner IC 3101 and a digital TV decoder LSI 3102.

The tuner IC 3101 includes the input terminal 2100 and the signal input unit 2101 both described above according to the third embodiment. In addition, the tuner IC 3101 operates in the same way as the signal input unit 2101 described above according to the third embodiment.

The digital TV decoder LSI 3102 includes the image decoding unit 2102, the image control unit 2103, the frame management unit 2104, the fault duration measuring unit 2170, and the timer 2171 each of which has been described above according to the third embodiment. Thus, the digital TV decoder LSI 3102 is enabled to carry out the display image generation, the fault detection during decoding, and the display control in accordance with a result of the fault detection, and the BL control in accordance with the fault duration. In addition, the digital TV decoder LSI 3102 generates audio signals for the respective display images and outputs the thus generated audio signals to the speaker 3040.

According to the above configuration, the digital TV receiving device operates in the same way as the image control device 2010 according to the third embodiment.

Note that the details of the respective component units of the digital TV receiving device 3010 have been described above regarding the third embodiment. Thus, no further description is given here.

The speaker 3040 produces audio output according to the audio signals received from the digital TV decoder LSI 3102.

The liquid crystal monitor 3020 is identical in structure to the display device 2020 according to the third embodiment. Thus, no further description is given here.

4.2 Recapitulation of Fourth Embodiment

With the above configuration, the image display system 4 receives a digital television broadcasting wave with the antenna 3030 and digitally demodulates the wave into a TV signal by the tuner IC 3101. The image display system 4 outputs the TV signal to the digital TV decoder LSI 3102, together with first fault notification information indicating a fault detected upon signal input. The digital TV decoder LSI 3102 decodes the received TV signal to generate a display image and an audio signal. The digital TV decoder LSI 3102 extracts a feature of the thus generated display image in accordance with either or both of the first fault notification information and second fault notification information. The second fault notification information is generated if a fault has been detected during the decoding. The digital TV decoder LSI 3102 then calculates a luminance value and an intensity value from the thus calculated feature.

In the image display system 4, the speaker 3040 produces audio output according to an audio signal generated by the digital TV decoder LSI 3102. In synchronism with the audio output, the digital TV decoder LSI 3102 presents display images generated by the digital TV decoder LSI 3102 at the respective luminance values calculated by the digital TV decoder LSI 3102, with the backlight illuminated at the respective intensity values calculated by the digital TV decoder LSI 3102.

In FIG. 21, the tuner IC 3101 and the digital TV decoder LSI 3102 are illustrated as separate LSIs. With the current semiconductor fabrication technology, however, it is naturally appreciated that the tuner IC 3101 and the digital TV decoder LSI 3102 may be implemented as a single LSI, i.e., system LSI.

In addition, although the example illustrated in FIG. 21 embodies a digital TV viewer terminal (digital TV receiver), the present invention may be embodied as any system or device that includes a reflection-type display device that receives an image signal from a signal network in which a fault may occur. Examples such systems and devices include a TV mobile phone terminal, an image viewer, and a PDA. The present invention enables any of such systems and devices to provide high image quality and to achieve energy savings.

5. Fifth Embodiment

The following describes an mage control device according to a fifth embodiment of the present invention, focusing on differences with the image control device 1010 according to the second embodiment.

The image control device according to the fifth embodiment differs from the image control device 1010 according to the second embodiment, with respect to the display control unit. The other component units (the signal input unit and the image decoding unit) are identical to those of the image control device 1010.

The following describes a display control unit 4103 only. Regarding the other component units (the signal input unit and the image decoding unit), no further description is given.

As necessary, the other component units, namely the signal input unit and the image decoding unit, are described by referencing the description of the corresponding component units (i.e., the signal input unit 1101 and the image decoding unit 1102).

In addition, the other device (display device) is identical to that of the second embodiment. Thus, the related description is basically omitted and given as necessary by referencing the description of the display device 1020 and corresponding component units according to the second embodiment.

5.1 Display Control Unit 4103

Figure 22:
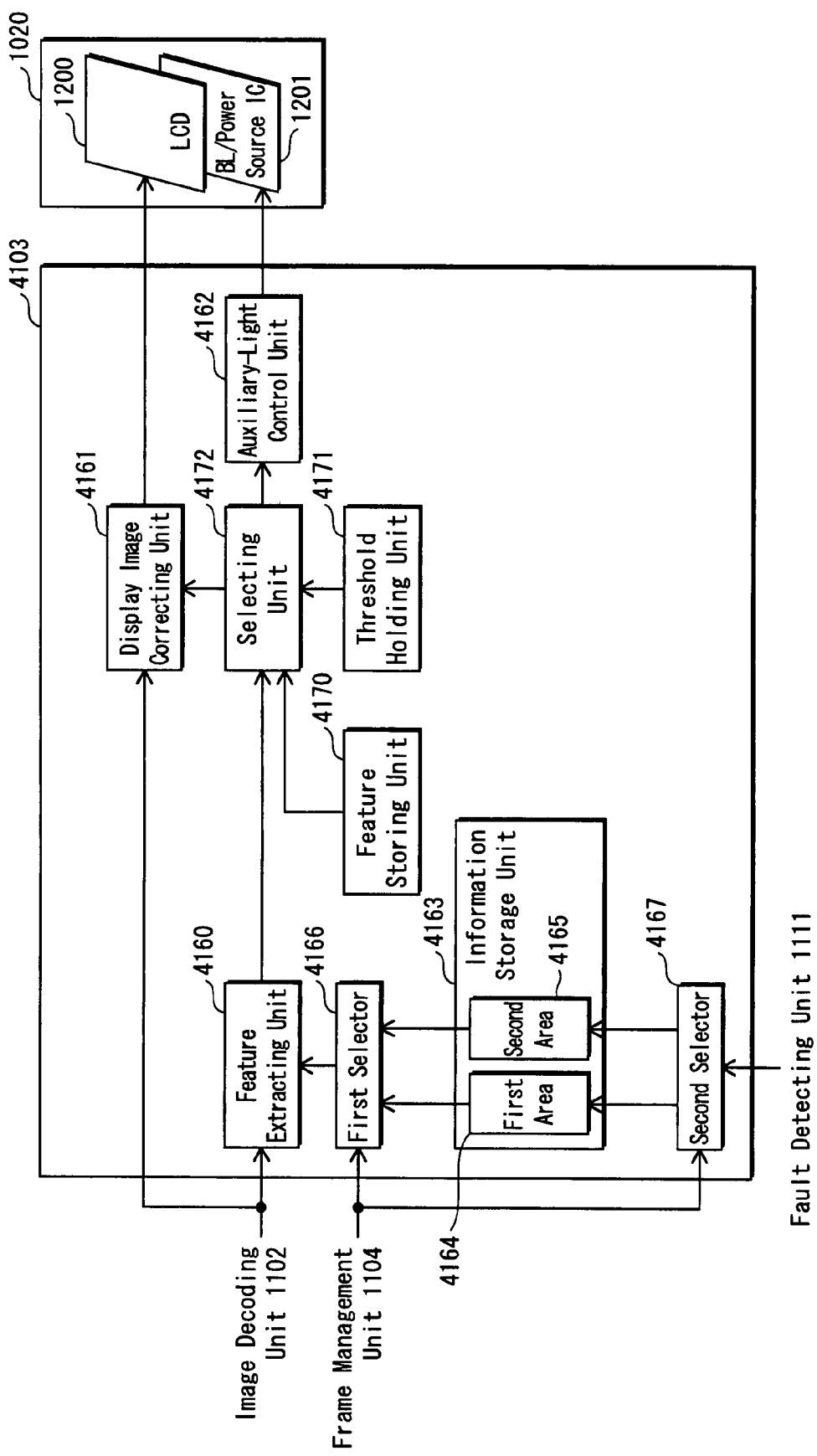
FIG. 22 is a block diagram illustrating the structure of a display control unit 4103.

As illustrated in FIG. 22, the display control unit 4103 is generally composed of a feature extracting unit 4160, a display image correcting unit 4161, an auxiliary-light control unit 4162, an information storage unit 4163, first and second selectors 4166 and 4167, a feature storing unit 4170, a threshold holding unit 4171, and a selecting unit 4172.

The information storage unit 4163 has first and second are as 4164 and 4165.

Each of the information storage unit 4163, the first selector 4166, and the second selector 4167 is respectively identical to the information storage unit 2163, the first selector 2166, and the second selector 2167 according to the third embodiment. Thus, no further description is given here.

(1) Feature Storing Unit 4170

The feature storing unit 4170 has an are a for storing a feature used to control display of an immediately previous display image (herein after, simply "previous image") to the currently processed display image. That is to say, the feature storing unit 4170 has an are a for storing the feature used for calculating the luminance value and intensity value of the previous image.

Hereinafter, the feature stored in the feature storing unit 4170 is referred to as a previous feature.

(2) Feature Extracting Unit 4160

The feature extracting unit 4160 extracts a feature of a display image in the similar manner to the feature extracting unit 1160 according to the second embodiment. The feature extracting unit 4160 then outputs the extracted feature to the selecting unit 4172.

The feature extracting unit 4160 calculates the size of the region used for the feature extraction and outputs the calculated region size to, the selecting unit 4172.

If no feature is extracted, the feature extracting unit 4160 outputs the feature "0" and the region size "0" to the selecting unit 4172.

(3) Threshold Holding Unit 4171

The threshold holding unit 4171 stores a threshold function f(x) in advance. With an input of a difference x between the previous feature and the feature calculated by the feature extracting unit 4160, the threshold function f(x) returns a threshold.

Note that the threshold function f(x) may be implemented by a program.

(4) Selecting Unit 4172

On receiving a feature (herein after, "current feature") from the feature extracting unit 4160 along with the region size, the selecting unit 4172 reads the previous feature from the feature storing unit 4170 and also reads the threshold function f(x) from the threshold holding unit 4171. The selecting unit 4172 calculates the difference x between the current and previous features.

The selecting unit 4172 applies the calculated difference x to the threshold function f(x) held in the threshold holding unit 4171 to calculate a threshold.

The selecting unit 4172 compares the region size with the threshold.

If the comparison result shows that the region size is greater than or equal to the threshold, the selecting unit 4172 selects the current feature as a valid feature.

On the other hand, if the comparison result shows that the region size is smaller than the threshold, the selecting unit 4172 selects the previous feature as a valid feature.

The selecting unit 4172 outputs the selected one of the current and previous features to the display image correcting unit 4161 and also to the auxiliary-light control unit 4162.

In addition, the selecting unit 4172 updates the previous feature stored in the feature storing unit 4170 by overwriting it with the selected feature.

Note that the selecting unit 4172 makes no selection if the receive feature indicates "0". In this case, the selecting unit 4172 outputs non-selection information to the display image correcting unit 4161 and also to the auxiliary-light control unit 4162. The non-selection information indicates that selection of a feature is not made.

Figure 23:
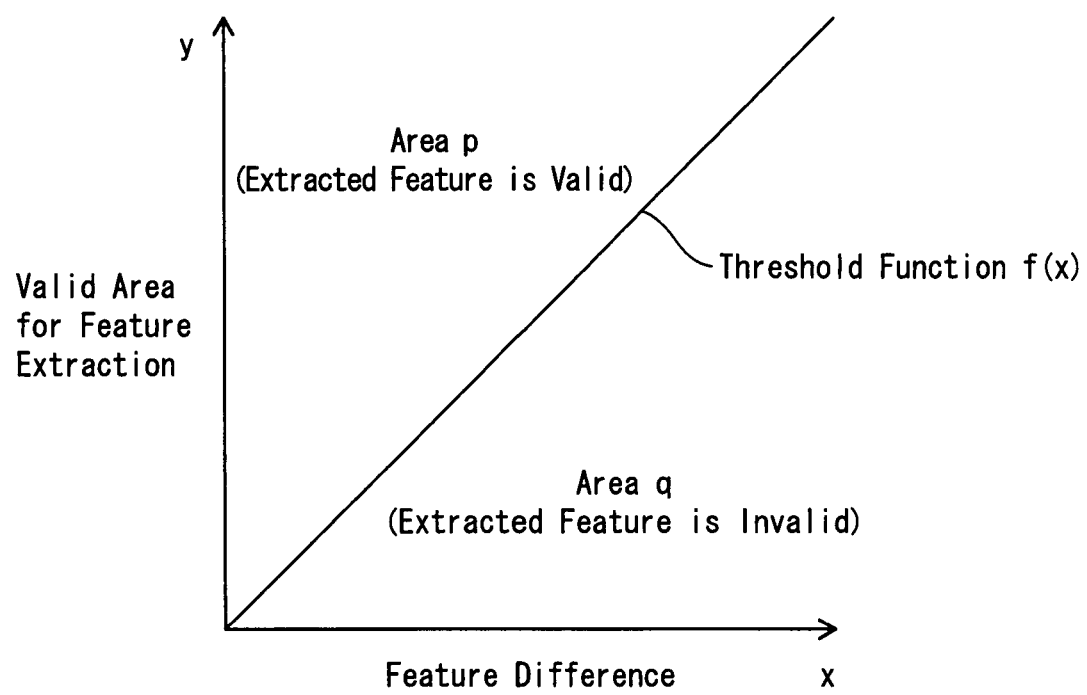
FIG. 23 illustrates feature selection performed based on a threshold.

The following is additional explanation of the feature selection based on the threshold, with reference to FIG. 23.

FIG. 23 illustrates a graph, wherein the horizontal axis (x axis) indicates the difference between previous and current features and the vertical axis (y axis) indicates the size of a region in which no fault has occurred, i.e., the size of a region used for the feature extraction.

According to the present embodiment, the line representing the threshold function f(x), which may be implemented by a program, divides the graph are a into two are as p and q. If the point corresponding to the calculated region size falls within in the are a p, the current feature is determined to be valid. On the other hand, if the point corresponding to the calculated region size falls within in the are a q, the current feature is determined to be invalid an thus the previous feature is selected as a valid feature.

If a feature is extracted from a relatively larger region of a display image to be presented, it means that the display image is more accurately generated. Thus, it is reasonable to regard the feature extracted from the relatively large region (i.e. current feature) is correct, even if the difference with the previous feature is large.

On the other hand, if a feature is extracted from a relatively smaller are a of a display image to be presented, it means that the display image is not accurately generated (that a number of faults has occurred in the display image). In such a case, a large difference with the previous feature means that unnecessary flickering would be the result. In order to prevent such flickering, the current feature is invalidated and the previous feature is used instead.

Although the threshold function f(x) employed in the above embodiment is a linear function that is modeled by a straight line as illustrated in FIG. 23, this is without limitation. For example, the threshold function may be a function that is modeled by a curved line, such as a gamma function or a polynomial function.

(5) Display Image Correcting Unit 4161

The display image correcting unit 4161 acquires a display image from the are a currently connected to the first selector 1152 of the image decoding unit 1102.

The display image correcting unit 4161 receives a feature of a display image from the selecting unit 4172. The display image correcting unit 4161 calculates the luminance value of the display image based on the received feature and outputs the calculated luminance value and the display image to the display device 1020.

If non-selection information is received from the selecting unit 4172, the display image correcting unit 4161 outputs the display image alone to the display device 1020.

Note that details of the luminance value calculation based on a feature of a display image are given in Patent Document 2, so that no further description is given here.

(6) Auxiliary-Light Control Unit 4162

The auxiliary-light control unit 4162 receives a feature of a display image from the selecting unit 4172 and calculates from the received feature the intensity value of auxiliary-light to be emitted. The auxiliary-light control unit 4162 then outputs the calculated intensity value to the display device 1020.

If non-selection information is received from the selecting unit 4172, the auxiliary-light control unit 4162 outputs non-calculation information to the display device 1020.

Note that details of the auxiliary-light intensity calculation based on a feature of a display image are given in Patent Document 2, so that no further description is given here.

5.2 Recapitulation of Fifth Embodiment

The following is additional explanation of the specific operation of the image control device according to the fifth embodiment, with reference to FIG. 24.

Figure 24A:
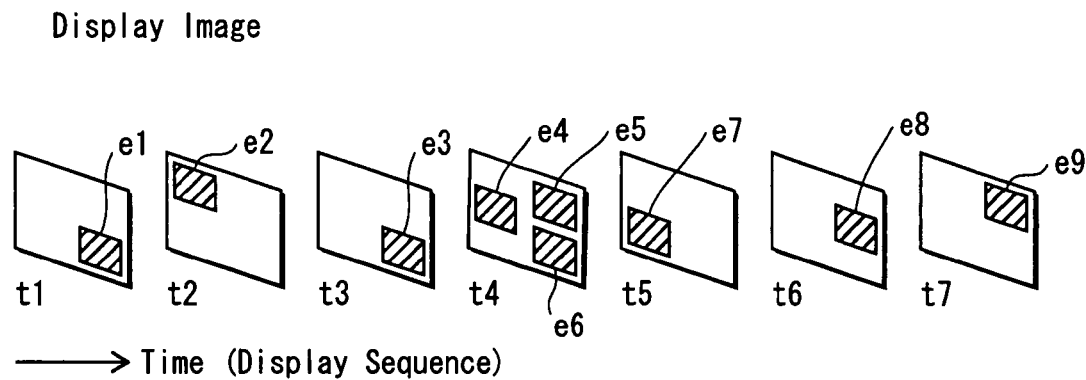
FIG. 24 illustrate a specific operation performed for the feature selection based on a threshold.

FIG. 24A illustrates display images in the display sequence (t1-t7). In the example illustrated in FIG. 24A, each of the display images involves an image fault and the faults differ from one another in location and region size. In this example, the display images have fault regions e1-e9.

In the case of common types of signal faults, the resulting faults occur at any random locations in display images. That is, there is no correlation or continuity among faults occurred in successive display images.

Figure 24B:
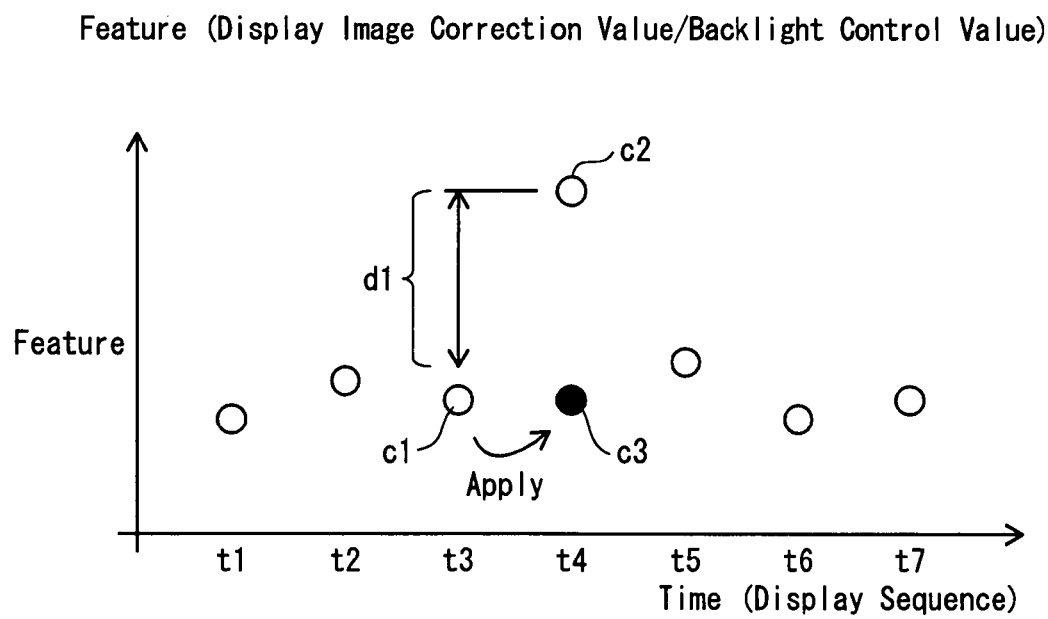

In view of the above, FIG. 24B illustrates an example of features extracted from a series of display images each having a fault.

Generally, each display image does not differ much from the immediately previous display image. Thus, if the display images contain a fault of a similar size at a similar location, especially if the faults in the respective display images are of a similar size, the extracted features vary generally smoothly even if the display images involve faults. As illustrated in FIG. 24B, the features extracted form display images t1-t3 as well as t5-t7 are generally similar to each other.

However, since the display image t4 includes fault regions e4, e5, and e6, which takes up a relatively large region of the entire display image. Thus, the feature extracted from the display image t4 significantly differs from the features extracted from the other display images.

In the example illustrated in FIG. 24B, the difference d1 between the feature c1 of the display image t3 and the feature c4 of the display image t4 is relatively large. The larger difference d1 results in a larger change in the backlight intensity that would occur upon displaying the display image t4, which leads to more noticeable flickering.

In view of the above, the image control device according to the present invention checks if the region size is smaller than the threshold calculated by applying the difference d1 to the threshold function held in the threshold holding unit 4171. If the region size is smaller, the feature c2 extracted from the display image t4 is invalidated. Instead, the feature c1 extracted from the display image t3 is used (as the new feature c3) for the display image t4. With this armament, erroneous illumination of the backlight is prevented and thus occurrence of flickering is suppressed.

Note that the display control according to the present invention is conducted in view of the difference between features of successive display images. Yet, in the case of MPEG motion picture decoding, the difference between display images can be readily extracted based on information such as motion vectors included in the coded data. Thus, the present invention may be embodied so as to control the image display based on the features of the respective display images, in combination with the difference between the features of successive display images.

According to the above embodiment, it is judged whether to select the current or previous feature as a valid feature for displaying the current display image. With this arrangement, unnecessary screen flickering is prevented.

In addition, since the image control device extracts a feature of a display image from a region of the display image that is free from a fault. With this arrangement, power saving is achieved without compromising image quality.

6. Modifications

The above embodiments and modifications are described merely by way of examples embodying the present invention. The present invention is not limited to the specific embodiments and modifications described above and various further modifications may be made without departing from the gist of the present invention. For examples, the following modifications still fall within the scope of the present invention.

(1) Specifically, each of the devices described above is a computer system generally composed of a microprocessor, ROM, RAM, and hard disk unit. The RAM or hard disk unit stores a computer program. The microprocessor operates in accordance with the computer program, so that each device performs its functionality. The computer program is composed of a plurality of sets of computer instructions to achieve the functionality.

(2) Some or all of the component units of each device described above may be implemented in a single system LSI (Large Scale Integration) circuit. The system LSI is a super-multifunction LSI circuit manufactured by fabricating multiple modules on a single chip. Specifically, the system LSI is a computer system composed of a microprocessor, ROM, RAM, and possibly other components. The RAM stores a computer program. The microprocessor operates in accordance with the computer program, so that the system LSI carries out its functionality.

Some or all of the component units of each device described above may be implemented on separate chips or on a single chip.

Although a system LSI is specifically mentioned above, the circuit may be referred to as IC, LSI, super LSI, or ultra LSI, depending on the packaging density. In addition, an integrated circuit may be fabricated not only by way of LSI. For example, it is applicable to use an FPGA (Field Programmable Gate Array) that enables post-manufacturing programming of an LSI circuit. It is also applicable to use a reconfigurable processor that allows reconfiguration of connection between circuit cells within an LSI circuit and their settings.

When any new circuit integration technology becomes available or derived as the semiconductor technology advances, such new technology may be employed to integrate the functional blocks of the present invention. One possible candidate of such new technology may be achieved by adapting biotechnology.

(3) The present invention may be embodied as any of the methods described above or a computer program for causing a computer to execute such a method. Furthermore, the present invention may be embodies as a digital signal representing such a computer program.

Still further, the present invention may be embodied as a computer-readable recording medium storing the computer program or digital signal mentioned above. Examples of compute-readable recording media include a flexible disk, hard disk, CD-ROM, MO, DVD, DVD-ROM, DVD-RAM, BD (Blu-ray Disc), and semiconductor memory. Still further, the present invention may be embodied as the computer program or digital signal per se stored on such a recording medium.

Still further, the present invention may be embodied as the computer program or digital signal that is transmitted via a telecommunication network, wireless or wired communication network, a network typified by the Internet, or data broadcasting.

Still further, the present invention may be embodied as a computer system generally composed of a microprocessor and memory. The memory stores the computer program mentioned above and the microprocessor operates in accordance with the computer program.

Still further, the program or digital signal mentioned above may be transferred inform of a recording medium mentioned above or via a network mentioned above, so that the program or digital signal may be executed by another independent computer system.

(4) The present invention may be embodied as any combination of the above-described embodiments and modifications.

7. Recapitulation (1) The present invention may be embodied as an image display device for optimizing a display condition of an image requested to be displayed. The optimization is achieved by controlling, according to the display image, an amount of light to be emitted by an auxiliary light of a reflection-type display as well as a correction value for correcting the display image. The image display device includes: a signal input unit that inputs a signal carrying image information, detects a signal fault, and outputs a first fault-notification signal; and a correcting unit that adjusts, according to the first fault-notification signal, the amount of auxiliary light to be emitted as well as the correction value for correcting the display image.

(2) The image display device described in the above paragraph (1) may further include an image decoding unit that inputs a compressed signal carrying image information, detects a fault in the signal, and outputs second fault information and a decoded image. The correcting unit may make the adjustment of the auxiliary light amount and the correction value according to the first and second fault notification signals, for a region of the decoded display image.

(3) The image display device described in the above paragraph (1) or (2) may further include a timer that inputs the first fault signal and measures the duration of a fault. The correcting unit may make the adjustment of the auxiliary light amount and the correction value, if the timer detects that the image fault continues for a predetermined time period or longer.

(4) The present invention may also be embodied as an image display system that includes: a signal input unit that inputs a signal carrying image information, detects a signal fault, and outputs a first fault notification signal; a correcting unit that adjusts, according to the first fault notification signal, the amount of auxiliary light to be emitted as well as the correction value for correcting the image requested to be displayed; a display control unit that causes the auxiliary light to emit light of the amount adjusted by the correcting unit; and a reflection type display that displays the requested display image as corrected by the correcting unit.

(5) According to the image display device described in any of the above paragraphs (1) through (3) and the image display system described in the above paragraph (4), the correcting unit corrects the amount of auxiliary light to be emitted and the correction value of the requested display image according to the first fault notification signal. The correcting unit may include: a feature storing unit that stores a feature of a previous display image; and a feature selecting unit for receiving a difference between the feature of the currently processed display image output from the feature extracting unit and the previous feature held in the feature storing unit. The feature selecting unit may output the feature of the current display image if the difference between the current and previous features is smaller than the threshold and to output the previous feature if the difference is larger than the threshold.

(6) The present invention may be embodied as an image display device having a signal input device that detects a fault in a signal and that inputs a signal carrying image information. The image display device also has a correction mechanism for adjusting, according to the fault notification signal output by the signal input device, the amount of auxiliary light to be emitted as well as the correction value for correcting the image requested to be displayed.

When an input signal involves a fault, it is said that a requested display signal is not a correct image. That is, the final display image is with disturbance and thus is invalid. In such a case, the image display device having the above configuration adjusts the amount of auxiliary light and the display image to achieve further energy savings. More specifically, the auxiliary light is dimmed.

(7) The image display device described in the above paragraph (6) may further have an image decoding device that decides compressed image information. The image decoding device sequentially detects a fault during the decoding of the image information.

With the above configuration, the image display device detects faults one by one, so that a location of each fault in the display image is specified with accuracy. Thus, the feature extraction is later performed only from a fault-free region of the display image. As a result, the image degradation resulting from occurrence of a fault is avoided.

(8) Further, according to the present invention, a timer device may measure a duration of a fault notified with a fault signal. When the fault duration reaches a predetermined time period, the amount of auxiliary light is reduced or the auxiliary light is turned off, which leads to further power savings.

(9) According to the present invention, a state signal is detected prior to the generation of a display image, so that occurrence of a fault is informed. With use of the state signal, the feature extraction processing is performed at a later stage in a manner to optimize the intensity value of auxiliary light to be emitted and the correction value for the display image. As a result, the light source is controlled to avoid unnecessary emission of light without causing image degradation, so that energy that would otherwise be consumed is saved.

(10) According to the state-of-the-art, a feature is extracted from an image that includes a region in which a fault has occurred. Thus, the image corresponding to a fault region (region with violation) is adversely affected. In addition, the auxiliary light amount and the image correction are not precisely adjusted for actual images, which leads to image degradation.

According to the present invention, however, such image degradation is avoided, since a fault region is excluded from the optimization processing (feature extraction processing).

(11) In addition, the present invention may be embodied as an image control method for use by an image control device that decodes received image data into an image, generates display information based on the received image data, and outputs the image and the display information to a display device where the image is displayed at a display condition indicated by the display information. The image control method includes a step of receiving image data, a step of detecting an error from the image data, a specifying step of specifying, if the error is detected, a fault image region containing the error from an entire image region of the image data; and a control step of inhibiting use of the fault image region for generating display information that defines an image display condition according to which the display device performs the image display.

8. Industrial Applicability

An image control device according to the present invention is suitably applicable to the technical field of controlling a reflection type display device that receives an image signal via a signal network on which a fault may occur and that displays the received image signal.

In addition, each of the devices described above is usable in the industrial field of manufacturing and selling devices for decoding a compressed moving picture to generate display images and controlling display of the generated images on a commercial basis, i.e., on a continuous and repetitive basis.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image control device for generating (i) an image to be displayed from received image data and (ii) display information based on the received image data, and outputting the image and the display information to a display device, the display information defining a display condition according to which the display device displays the image and indicating correction values for correcting luminance and intensity of the image data, the image control device comprising:
 a receiving unit operable to receive the image data attached to error-detecting data used for error detection;
 a detecting unit operable to detect any error data from the image data based on the error-detecting data attached to the image data, the detected error data (i) being a difference in the image data before and after being transmitted to the image control device, and (ii) occurring during the reception of the image data or the generation of the image;
 a specifying unit operable to specify a fault image region, which corresponds to the detected error data, from an entire image region represented by the image data, the fault image region being specified by the specifying unit when the error data is detected by the detecting unit; and
 a control unit operable to prohibit use of the specified fault image region for generating the display information that defines the display condition according to which the display device displays the image and indicating the correction values for correcting the luminance and the intensity of the image data,
 wherein the control unit includes:
  an extracting unit operable to extract a feature from an image region, of the entire image region represented by the image data, remaining after excluding the specified fault image region from the entire image region represented by the image data, the feature indicating or being related to an average luminance or a maximum luminance of the image region remaining after excluding the specified fault image region; and
  an output unit operable to generate the display information based on the extracted feature and to output the generated display information to the display device,
 wherein the receiving unit is operable to sequentially receive a plurality of pieces of image data, and
 wherein the image control device further comprises:
  a light amount calculating unit operable to:
   calculate, from a feature of each piece of image data of the plurality of pieces of image data, an amount of light to be produced by an auxiliary light; and
   output the calculated amount of light to the display device for causing the display device to display, with the calculated amount of light produced by the auxiliary light, an image generated from each piece of image data of the plurality of pieces of image data;
  a judging unit operable to judge whether or not two or more pieces of image data, of the plurality of pieces of image data, each detected to contain the error data have been successively received; and
  a fault monitoring unit operable to control, when the judging unit judges that the two or more pieces of image data each detected to contain the error data have been successively received, the light amount calculating unit to (i) re-calculate the amount of light to be produced by the auxiliary light for each piece of image data of the two or more pieces of image data detected to contain the error data, such that the amount of light initially calculated is reduced by a predetermined ratio and (ii) output the re-calculated amount of light to be produced by the auxiliary light.

2. The image control device according to claim 1,
wherein the image data includes a plurality of macroblocks,
wherein the detecting unit is operable to perform the detection of the error data separately on each macroblock of the plurality of macroblocks, and
wherein the specifying unit is operable to specify, as the fault image region, a macroblock, of the plurality of macroblocks, in which the error data is detected.

3. The image control device according to claim 1,
wherein the image data includes a plurality of macroblocks,
wherein the detecting unit is operable to perform the detection of the error data separately on each macroblock of the plurality of macroblocks, and
wherein the specifying unit is operable to specify, as the fault image region, a predetermined area including a macroblock, of the plurality of macroblocks, in which the error data is detected.

4. The image control device according to claim 3,
wherein the predetermined area is a horizontally extending region including the macroblock in which the error data is detected, and
wherein the specifying unit is operable to specify the horizontally extending region as the fault image region.

5. The image control device according to claim 4,
wherein the horizontally extending region is one horizontal line of an image generated from the image data, and
wherein the specifying unit is operable to specify, as the fault image region, one horizontal line including the macroblock in which the error data is detected.

6. The image control device according to claim 3,
wherein the predetermined area is a vertically extending region including the macroblock in which the error data is detected, and
wherein the specifying unit is operable to specify, as the fault image region, the vertically extending region including the macroblock in which the error data is detected.

7. The image control device according to claim 6,
wherein the vertically extending region is one vertical line of an image generated from the image data, and
wherein the specifying unit is operable to specify, as the fault image region, one vertical line including the macroblock in which the error data is detected.

8. The image control device according to claim 3,
wherein the predetermined area is a region enclosed to surround the macroblock in which the error data is detected, and
wherein the specifying unit is operable to specify the enclosed region as the fault image region.

9. The image control device according to claim 1,
wherein the control unit further includes:
 a storage unit operable to store a previous feature of a display image to be displayed previously to the image data; and
 a selecting unit operable to judge whether or not the feature currently extracted from the image data by the extracting unit is valid, and to select the currently extracted feature when the currently extracted feature is judged to be valid and to select the previous feature when the currently extracted feature is judged to be invalid, and
wherein the output unit is operable to generate the display information based on the feature selected by the selecting unit.

10. The image control device according to claim 9,
wherein the selecting unit is operable to compare a threshold determined by a difference between the previous feature and the currently extracted feature with a size of the image region from which the currently extracted feature is extracted, and
wherein the currently extracted feature is judged to be valid when the image region size is larger than or equal to the threshold and is judged to be invalid when the image region size is smaller than the threshold.

11. The image control device according to claim 1, wherein the judging unit includes a timer and is operable to:
 activate the timer when the detecting unit detects any error data from the image data while the timer is inactive, the timer being operable to measure a time period during which the two or more pieces of image data, of the plurality of pieces of image data, each detected to contain the error data have been successively received; and
 judge that that two or more pieces of image data each detected to contain the error data have been successively received when the time period measured by the timer exceeds a predetermined time period.

12. The image control device according to claim 11, wherein the judging unit is operable to adjust a duration of the predetermined time period in accordance with a level of the error data detected by the detecting unit while the timer is inactive.

13. The image control device according to claim 1, wherein the judging unit includes a counter and is operable to:
 count a number of successively received pieces of image data, of the plurality of pieces image data, each detected to contain the error data; and
 judge that that the two or more pieces of image data each detected to contain the error data have been successively received when the number counted by the counter exceeds a predetermined number.

14. An image display system including:
a display device; and
an image control device operable to (i) generate an image to be displayed from received image data, (ii) generate display information based on the received image data, and (iii) output the image and the display information to the display device, the display information defining a display condition according to which the display device displays the image and indicating correction values for correcting luminance and intensity of the image data, the image control device comprising:
 a receiving unit operable to receive the image data attached to error-detecting data used for error detection;
 a detecting unit operable to detect any error data from the image data based on the error-detecting data attached to the image data, the detected error data (i) being a difference in the image data before and after being transmitted to the image control device, and (ii) occurring during the reception of the image data or the generation of the image;
 a specifying unit operable to specify a fault image region, which corresponds to the detected error data, from an entire image region represented by the image data, the fault image region being specified by the specifying unit when the error data is detected by the detecting unit; and
 a control unit operable to prohibit use of the specified fault image region for generating the display information that defines the display condition according to which the display device displays the image and indicating the correction values for correcting the luminance and the intensity of the image data,
wherein the control unit includes:
 an extracting unit operable to extract a feature from an image region, of the entire image region represented by the image data, remaining after excluding the specified fault image region from the entire image region represented by the image data, the feature indicating or being related to an average luminance or a maximum luminance of the image region remaining after excluding the specified fault image region; and
 an output unit operable to generate the display information based on the extracted feature and to output the generated display information to the display device,
wherein the receiving unit is operable to sequentially receive a plurality of pieces of image data, and
wherein the image control device further comprises:
 a light amount calculating unit operable to:
  calculate, from a feature of each piece of image data of the plurality of pieces of image data, an amount of light to be produced by an auxiliary light; and
  output the calculated amount of light to the display device for causing the display device to display, with the calculated amount of light produced by the auxiliary light, an image generated from each piece of image data of the plurality of pieces of image data;
 a judging unit operable to judge whether or not two or more pieces of image data, of the plurality of pieces of image data, each detected to contain the error data have been successively received; and a fault monitoring unit operable to control, when the judging unit judges that the two or more pieces of image data each detected to contain the error data have been successively received, the light amount calculating unit to (i) re-calculate the amount of light to be produced by the auxiliary light for each piece of image data of the two or more pieces of image data detected to contain the error data, such that the amount of light initially calculated is reduced by a predetermined ratio and (ii) output the re-calculated amount of light to be produced by the auxiliary light.

* * * * *